(12) United States Patent
Inomata et al.

(10) Patent No.: US 10,279,342 B2
(45) Date of Patent: May 7, 2019

(54) ION-EXCHANGE POLYMER AND PRODUCTION METHOD THEREFOR, ELECTROLYTE MEMBRANE AND PRODUCTION METHOD THEREFOR, AND COMPOSITION FOR PRODUCING ION-EXCHANGE POLYMER

(71) Applicant: FUJIFILM Corporation, Tokyo (JP)

(72) Inventors: Sotaro Inomata, Kanagawa (JP);
Keisuke Kodama, Kanagawa (JP);
Satoshi Sano, Kanagawa (JP);
Kuniyuki Kaminaga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 332 days.

(21) Appl. No.: 15/251,055

(22) Filed: Aug. 30, 2016

(65) Prior Publication Data

US 2016/0367980 A1    Dec. 22, 2016

Related U.S. Application Data

(63) Continuation of application No. PCT/JP2015/055410, filed on Feb. 25, 2015.

(30) Foreign Application Priority Data

Mar. 7, 2014 (JP) .................. 2014-045764
Jul. 31, 2014 (JP) .................. 2014-156958

(51) Int. Cl.
*B01J 41/14* (2006.01)
*B01D 69/10* (2006.01)
(Continued)

(52) U.S. Cl.
CPC .............. *B01J 41/14* (2013.01); *B01D 69/02* (2013.01); *B01D 69/10* (2013.01); *B01D 71/40* (2013.01);
(Continued)

(58) Field of Classification Search
CPC ........... B01J 41/14; B01J 47/12; B01D 69/02; B01D 71/40; B01D 71/80; B01D 2323/34;
(Continued)

(56) References Cited

U.S. PATENT DOCUMENTS 4,374,720 A * 2/1983 MacDonald ............. B01J 41/14
204/252
5,118,717 A    6/1992 Hodgdon et al.
7,087,654 B2   8/2006 MacDonald et al.

FOREIGN PATENT DOCUMENTS

JP   2002-515930 A   5/2002
JP   2005-291852 A   10/2005
JP   2011-506749 A   3/2011

OTHER PUBLICATIONS

International Search Report of PCT/JP2015/055410, dated Jun. 2, 2015. [PCT/ISA/210].

(Continued)

*Primary Examiner* — Helen Oi K Conley
(74) *Attorney, Agent, or Firm* — Sughrue Mion, PLLC

(57) ABSTRACT

There are provided an ion-exchange polymer including a structure represented by the following General Formula (1) and a production method therefor, an electrolyte membrane and a production method therefor, and a composition for producing an ion-exchange polymer.

(Continued)

General Formula (1)

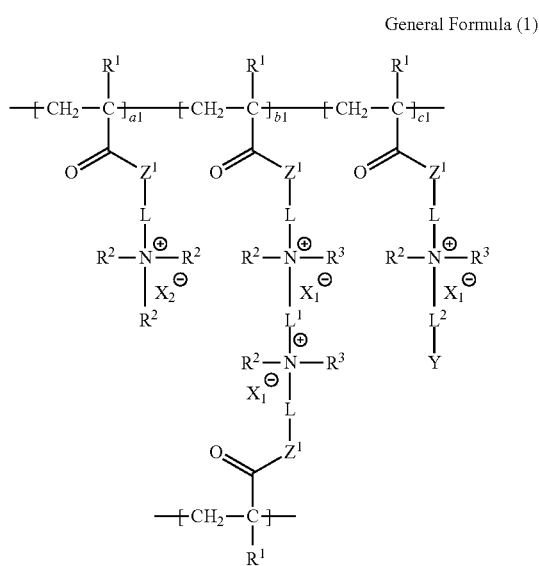

In a case where the sum of a1, b1, and c1 is 1.000, a1 is 0.000 to 0.750, b1 is 0.240 to 0.990, and c1 is 0.001 to 0.100. L represents an alkylene group, $L^1$ and $L^2$ each represent a divalent linking group, $R^1$ is a hydrogen atom or an alkyl group, $R^2$ and $R^3$ each represent an alkyl group or an allyl group, $X^{1-}$ and $X^{2-}$ each represent an inorganic or organic anion, and Y represents a halogen atom. $Z^1$ represents —O— or —NRa—, and Ra represents a hydrogen atom or an alkyl group.

21 Claims, 1 Drawing Sheet

(51) Int. Cl.

| | | |
|---|---|---|
| *C08F 220/56* | (2006.01) | |
| *B01D 69/02* | (2006.01) | |
| *B01D 71/80* | (2006.01) | |
| *C08J 5/22* | (2006.01) | |
| *B01D 71/40* | (2006.01) | |
| *B01J 47/12* | (2017.01) | |
| *C08F 222/38* | (2006.01) | |
| *H01M 8/1023* | (2016.01) | |
| *C08F 220/60* | (2006.01) | |
| *H01M 8/1072* | (2016.01) | |
| *H01M 8/22* | (2006.01) | |
| *H01M 8/1018* | (2016.01) | |

(52) U.S. Cl.
CPC .............. *B01D 71/80* (2013.01); *B01J 47/12* (2013.01); *C08F 220/56* (2013.01); *C08F 220/60* (2013.01); *C08F 222/385* (2013.01); *C08J 5/2231* (2013.01); *H01M 8/1023* (2013.01); *B01D 2323/34* (2013.01); *B01D 2325/42* (2013.01); *C08J 2333/26* (2013.01); *C08J 2335/00* (2013.01); *H01M 8/1072* (2013.01); *H01M 8/227* (2013.01); *H01M 2008/1095* (2013.01); *H01M 2300/0082* (2013.01); *Y02P 70/56* (2015.11)

(58) Field of Classification Search
CPC .. B01D 2325/42; C08F 220/56; C08F 220/60; C08F 222/385; C08J 5/2231; C08J 2335/00; H01M 8/102; H01M 8/1072; H01M 8/227
See application file for complete search history.

(56) References Cited

OTHER PUBLICATIONS

Communication dated Jun. 2, 2017, from the State Intellectual Property Office of People's Republic of China in counterpart Application No. 201580011979.5.

\* cited by examiner

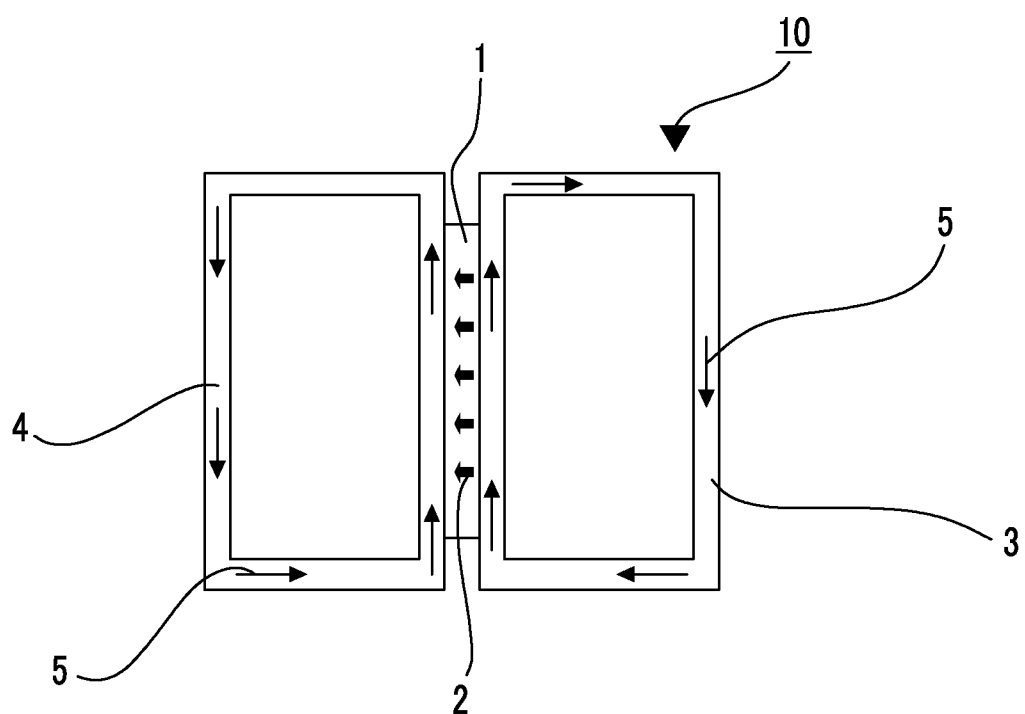

ION-EXCHANGE POLYMER AND PRODUCTION METHOD THEREFOR, ELECTROLYTE MEMBRANE AND PRODUCTION METHOD THEREFOR, AND COMPOSITION FOR PRODUCING ION-EXCHANGE POLYMER

CROSS-REFERENCE TO RELATED APPLICATIONS

This application is a Continuation of PCT International Application No. PCT/JP2015/055410 filed on Feb. 25, 2015, which claims priority under 35 U.S.C. § 119 (a) to Japanese Patent Application No. 2014-045764 filed on Mar. 7, 2014, and to Japanese Patent Application No. 2014-156958 filed on Jul. 31, 2014. Each of the above applications is hereby expressly incorporated by reference, in its entirety, into the present application.

BACKGROUND OF THE INVENTION

1. Field of the Invention

The present invention relates to an ion-exchange polymer and a production method therefor, an electrolyte membrane and a production method therefor, and a composition for producing an ion-exchange polymer.

2. Description of the Related Art

Ion-exchange membranes using an ion-exchange polymer are used in electrodeionization (EDI), continuous electrodeionization (CEDI), electrodialysis (ED), electrodialysis reversal (EDR), and reverse electrodialysis (RED). In addition, ion-exchange membranes are used in not only general applications but also medical applications, and in recent years, have been used in a solid polymer electrolyte type fuel cell.

Here, electrodeionization (EDI) is a water treatment process in which ions are removed from an aqueous liquid using an ion-exchange membrane and a potential to achieve ion transport. Unlike other water purification techniques for ion-exchange in the related art, electrodeionization (EDI) does not require the use of chemicals such as acids or caustic soda, and can be used to produce ultrapure water. Electrodialysis (ED) and electrodialysis reversal (EDR) are electrochemical separation processes in which ions or the like are removed from water or other fluids.

As a polymer functional membrane having various functions, an ion-exchange membrane, a reverse osmosis membrane, a forward osmosis membrane, a gas separation membrane, and the like are known.

Hitherto, various ion-exchange polymers and production examples therefor have been reported (for example, refer to JP2011-506749A and U.S. Pat. No. 7,087,654B).

SUMMARY OF THE INVENTION

An ion-exchange membrane is desired to have low electric resistance of a membrane and low water permeability.

If the charge density is high, the electric resistance of a membrane is reduced. However, as the charge density is higher, the membrane is likely to swell, and as a result, the water permeability becomes higher. On the other hand, if the crosslink density is increased by using a crosslinking agent having two or more polymerizable groups, swelling of a membrane can be reduced, but the charge density is correspondingly reduced.

Thus, the electric resistance of a membrane and the water permeability are in a trade-off relationship, and thus, it is the current situation is that it is difficult to achieve both a low electric resistance and a low water permeability.

Moreover, in addition to high permselectivity, it is also necessary to further improve the storage stability (durability) such as the durability with respect to membrane degradation by chlorine, that is, the durability with respect to chlorine, and the durability with respect to acids and an alkalis. In addition, a simple and inexpensive production method for an ion-exchange polymer and an electrolyte membrane is also necessary.

Accordingly, an object of the present invention is to provide an ion-exchange polymer and an electrolyte membrane which have a low electric resistance and low water permeability, high permselectivity, and excellent durability with respect to chlorine, acids, and an alkalis.

Furthermore, another object of the present invention is to provide a production method for the ion-exchange polymer which satisfies the above-described performance, is effective, and is capable of producing at low cost, a composition for production of the ion-exchange polymer, and a production method for the electrolyte membrane.

By the studies so far of the present inventors, it was found that an ion-exchange membrane formed of an acrylamide-based polymer prepared by using a compound (charged crosslinker) having both an ionic group and two or more crosslinkable polymerizable groups is excellent in the main performance as an ion-exchange membrane, such as electric resistance of the membrane and permselectivity.

The present inventors have further conducted studies to achieve the above-described objects, and as the result, they found that the above-described objects can be achieved by combining the unit obtained from the charged crosslinker with a specific unit at a specific ratio. The present invention has been completed based on these findings.

The above-described objects are achieved by the following means.

<1> An ion-exchange polymer comprising a structure represented by the following General Formula (1).

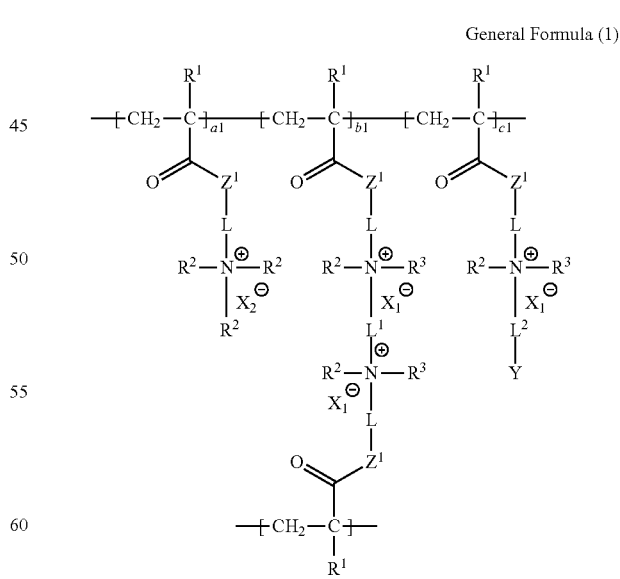

General Formula (1)

In General Formula (1), in a case where the sum of a1, b1, and c1 is 1.000, a1 is 0.000 to 0.750, b1 is 0.240 to 0.990, and c1 is 0.001 to 0.100. L represents an alkylene group, and $L^1$ and $L^2$ each independently represent a divalent linking group. $R^1$ represents a hydrogen atom or an alkyl group, and $R^2$ and $R^3$ each independently represent an alkyl group or an allyl group. $X_1^-$ and $X_2^-$ each independently represent an inorganic anion or an organic anion. Y represents a halogen atom. $Z^1$ represents —O— or —NRa—. Here, Ra represents a hydrogen atom or an alkyl group.

<2> The ion-exchange polymer according to <1>, in which the structure is a structure represented by the following General Formula (2).

General Formula (2)

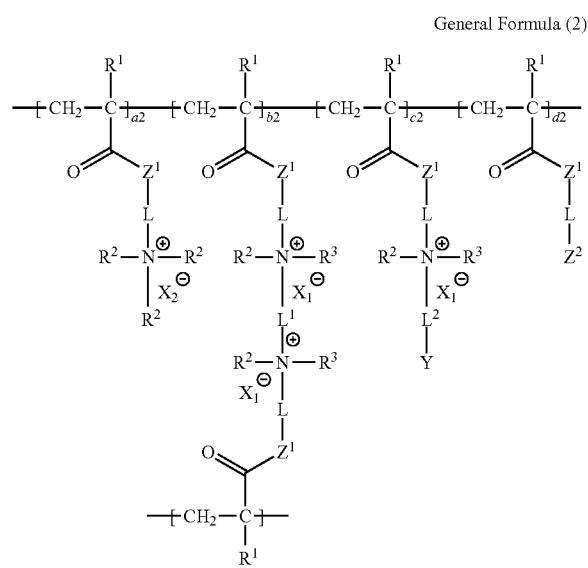

In General Formula (2), in a case where the sum of a2, b2, c2, and d2 is 1.000, a2 is 0.000 to 0.750, b2 is 0.240 to 0.990, c2 is 0.001 to 0.100, and d2 is 0.000 to 0.100. L, $L^1$, $L^2$, $R^1$ to $R^3$, $X_1^-$, $X_2^-$, Y, and $Z^1$ have the same meaning as L, $L^1$, $L^2$, $R^1$ to $R^3$, $X_1^-$, $X_2^-$, Y, and $Z^1$ in General Formula (1), respectively. $Z^2$ represents a group represented by the following General Formula (P-d1) or (P-d2). Moreover, $Z^2$ may include both the group represented by General Formula (P-d1) or the group represented by General Formula (P-d2).

General Formula (P-d1)

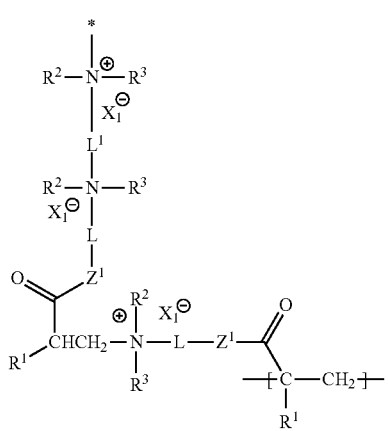

General Formula (P-d2)

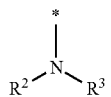

L, $L^1$, $R^1$ to $R^3$, $X_1^-$, and $Z^1$ in General Formulas (P-d1) and (P-d2) have the same meaning as L, $L^1$, $R^1$ to $R^3$, $X_1^-$, and $Z^1$ in General Formula (2), respectively. Here, * represents the portion to which L is bonded.

<3> The ion-exchange polymer according to <1> or <2>, in which c1 or c2 is 0.005 to 0.075.

<4> The ion-exchange polymer according to any one of <1> to <3>, in which b1 or b2 is 0.700 to 0.980, and c1 or c2 is 0.015 to 0.050.

<5> The ion-exchange polymer according to any one of <1> to <4>, which is formed by polymerizing and curing a composition containing at least one of a compound represented by the following General Formula (M-b) and at least one of a compound represented by the following General Formula (M-c).

General Formula (M-b)

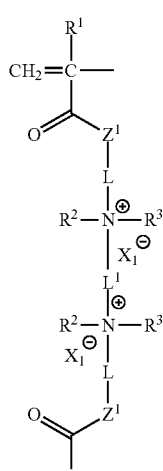

General Formula (M-c)

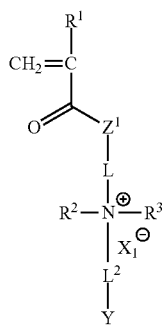

In General Formulas (M-b) and (M-c), $R^1$ represents a hydrogen atom or an alkyl group, and $R^2$ and $R^3$ each independently represent an alkyl group or an allyl group. L represents an alkylene group, and $L^1$ and $L^2$ each independently represent a divalent linking group. $X_1^-$ represents an inorganic anion or an organic anion. $Z^1$ represents —O— or —NRa—. Here, Ra represents a hydrogen atom or an alkyl group.

<6> The ion-exchange polymer according to <5>, in which the composition further contains a compound represented by the following General Formula (M-d2).

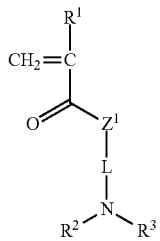

General Formula (M-d2)

In General Formula (M-d2), $R^1$ represents a hydrogen atom or an alkyl group, and $R^2$ and $R^3$ each independently represent an alkyl group or an allyl group. L represents an alkylene group. $Z^1$ represents —O— or —NRa—. Here, Ra represents a hydrogen atom or an alkyl group.

<7> The ion-exchange polymer according to <5> or <6>, in which the composition further contains a compound represented by the following General Formula (L-c).

$Y^a\text{-}L^2\text{-}Y$  General Formula (L-c)

In General Formula (L-c), $L^2$ represents a divalent linking group, and Y and $Y^a$ each independently represent a halogen atom.

<8> The ion-exchange polymer according to any one of <5> to <7>, in which 25.0 mol % to 99.0 mol % of the compound represented by General Formula (M-b) is included with respect to the entire monomer components in the polymer obtained by polymerizing and curing.

<9> The ion-exchange polymer according to any one of <5> to <8>, in which 50.0 mol % to 98.0 mol % of the compound represented by General Formula (M-b) is included with respect to the entire monomer components in the polymer obtained by polymerizing and curing.

<10> The ion-exchange polymer according to any one of <5> to <9>, which is formed by polymerizing and curing by irradiating the composition with active radiation.

<11> An electrolyte membrane comprising at least one ion-exchange polymer according to any one of <1> to <10>.

<12> The electrolyte membrane according to <11> comprising a support.

<13> The electrolyte membrane according to <12>, in which the support is selected from woven fabric and non-woven fabric.

<14> The electrolyte membrane according to <12> or <13>, which is formed by impregnating the support with the composition, and then polymerizing and curing the composition.

<15> A composition for production of an ion-exchange polymer according to any one of <1> to <10> comprising a compound represented by the following General Formula (M-b), a compound represented by the following General Formula (M-c), a water-soluble solvent, and a polymerization inhibitor.

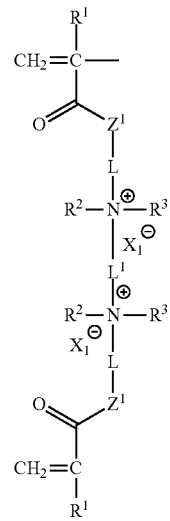

General Formula (M-b)

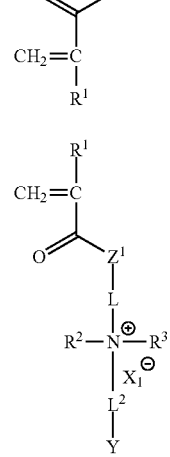

General Formula (M-c)

In General Formulas (M-b) and (M-c), $R^1$ represents a hydrogen atom or an alkyl group, and $R^2$ and $R^3$ each independently represent an alkyl group or an allyl group. L represents an alkylene group, and $L^1$ and $L^2$ each independently represent a divalent linking group. $X_1^-$ represents an inorganic anion or an organic anion. $Z^1$ represents —O— or —NRa—. Here, Ra represents a hydrogen atom or an alkyl group.

<16> The composition for production of an ion-exchange polymer according to <15>, further comprising a compound represented by the following General Formula (M-d2).

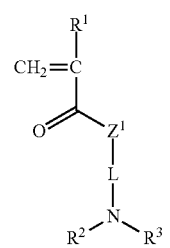

General Formula (M-d2)

In General Formula (M-d2), $R^1$ represents a hydrogen atom or an alkyl group, and $R^2$ and $R^3$ each independently represent an alkyl group or an allyl group. L represents an alkylene group. $Z^1$ represents —O— or —NRa—. Here, Ra represents a hydrogen atom or an alkyl group.

<17> The composition for production of an ion-exchange polymer according to <15> or <16>, further comprising a compound represented by the following General Formula (L-c).

$$Y^a\text{-}L^2\text{-}Y \qquad \text{General Formula (L-c)}$$

In General Formula (L-c), $L^2$ represents a divalent linking group, and Y and $Y^a$ each independently represent a halogen atom.

<18> The composition for production of an ion-exchange polymer according to any one of <15> to <17>, in which the water-soluble solvent is water.

<19> The composition for production of an ion-exchange polymer according to any one of <15> to <18>, in which the compound represented by General Formula (M-b) is contained in the composition in 60 parts by mass to 99 parts by mass with respect to 100 parts by mass of the composition.

<20> A production method for an ion-exchange polymer comprising irradiating the composition for production of an ion-exchange polymer according to any one of <15> to <19> with active radiation to be polymerized and cured.

<21> A production method for an electrolyte membrane comprising impregnating the support with the composition for production of an ion-exchange polymer according to any one of <15> to <19>, and then polymerizing and curing the composition.

In the specification, "to" is used to describe a range in which the numerical values shown before and after "to" indicate the upper limit value and the lower limit value.

In addition, in each general formula, unless specified otherwise, in a case where a plurality of groups having the same sign are present, these may be the same as or different from each other, and in a case where a plurality of repetitions of partial structures are present, these repetitions may be the same as or may be a mixture of different repetitions in the range specified.

Furthermore, even in a case where one of isomers is described for convenience of display, unless otherwise specified, the geometric isomer which is a substitution pattern of a double bond in each general formula may be an E isomer or a Z isomer, or may be a mixture thereof.

In the present invention, the term "acryl" includes not only a compound in which a methyl group has been substituted at the α position of an acyl group such as acryl or methacryl but also a compound in which an alkyl group has been substituted, and is used as a collective term with acids or salts thereof, esters, and amides. That is, the term "acryl" includes both acrylic esters, acrylamide, or acids or salts thereof, and α-alkyl substituted acrylic esters, and amides, and α-alkyl substituted acrylic acids or salts thereof.

In addition, a substituent specified in each general formula, for example, an alkyl group or the like may be further substituted with a substituent, unless otherwise specified, and in the present invention, as such a substituent, a substituent group α described below may be exemplified. Furthermore, unless specified otherwise, adjacent substituents may bonded to each other to form a ring.

According to the present invention, it is possible to provide an ion-exchange polymer and an electrolyte membrane which have a low electric resistance and low water permeability, high permselectivity, and excellent durability with respect to chlorine, acids, and alkalis. Additionally, it is possible to provide a production method for the ion-exchange polymer which is effective and capable of producing at low cost, a composition for production of the ion-exchange polymer, and a production method for the ion-exchange polymer.

The above-described or other features and advantages of the present invention will become apparent from the following description with reference to the suitably accompanying drawings.

BRIEF DESCRIPTION OF THE DRAWING

FIG. 1 is a schematic diagram schematically showing a flow path of a device for measuring water permeability of a film.

DESCRIPTION OF THE PREFERRED EMBODIMENTS

<<Ion-Exchange Polymer>>

An ion-exchange polymer of the present invention a polymer including a structure represented by the following General Formula (1).

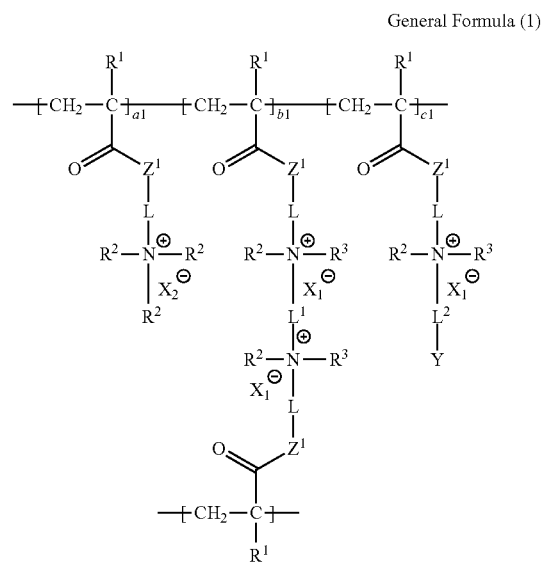

General Formula (1)

In General Formula (1), in a case where the sum of a1, b1, and c1 is 1.000, a1 is 0.000 to 0.750, b1 is 0.240 to 0.990, and c1 is 0.001 to 0.100. L represents an alkylene group, and $L^1$ and $L^2$ each independently represent a divalent linking group. $R^1$ represents a hydrogen atom or an alkyl group, and $R^2$ and $R^3$ each independently represent an alkyl group or an allyl group. $X_1^-$ and $X_2^-$ each independently represent an inorganic anion or an organic anion. Y represents a halogen atom. $Z^1$ represents —O— or —NRa—. Here, Ra represents a hydrogen atom or an alkyl group.

The polymer including the structure represented by General Formula (1) is formed of units a, b, and c, and among these, the units b and c are essential.

General Formula (1)

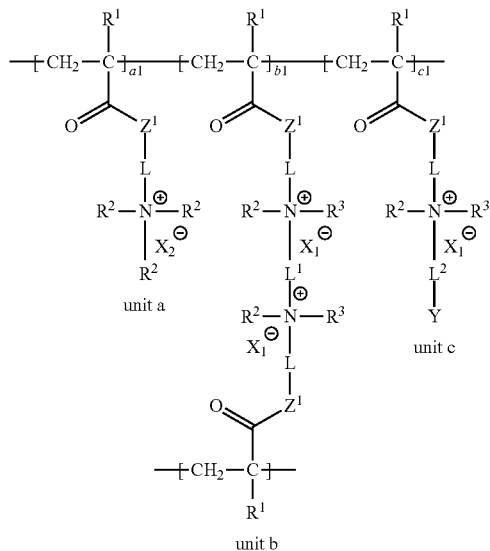

unit a unit b unit c

The polymer having the structure represented by General Formula (1) is not necessarily formed of only the units a to c, and may further include another unit.

A polymer including such a unit is preferably a polymer represented by the following General Formula (2) in which a unit d has been added.

General Formula (2)

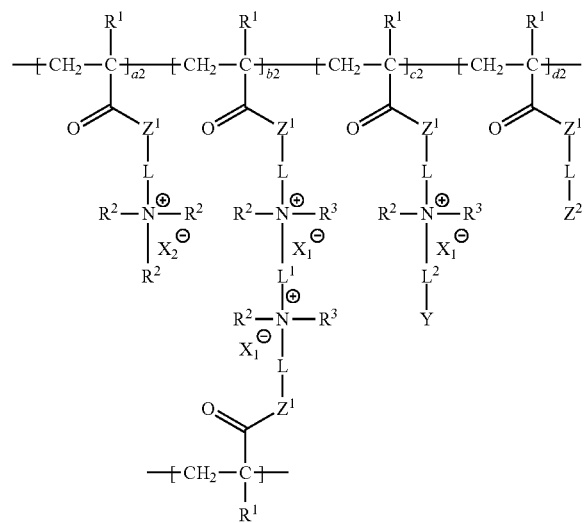

In General Formula (2), in a case where the sum of a2, b2, c2, and d2 is 1.000, a2 is 0.000 to 0.750, b2 is 0.240 to 0.990, c2 is 0.001 to 0.100, and d2 is 0.000 to 0.100. L, $L^1$, $L^2$, $R^1$ to $R^3$, $X_1^-$, $X_2^-$, Y, and $Z^1$ have the same meaning as L, $L^1$, $L^2$, $R^1$ to $R^3$, $X_1^-$, $X_2^-$, Y, and $Z^1$ in General Formula (1), respectively, and the preferable ranges thereof are also the same. $Z^2$ represents a group represented by the following General Formula (P-d1) or (P-d2). Moreover, $Z^2$ may include both the group represented by General Formula (P-d1) or the group represented by General Formula (P-d2).

General Formula (P-d1)

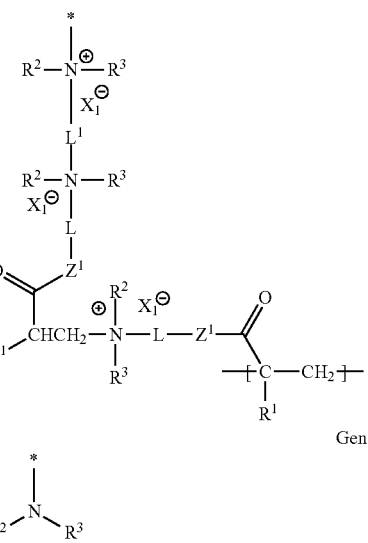

General Formula (P-d2)

L, $L^1$, $R^1$ to $R^3$, $X_1^-$, and $Z^1$ in General Formulas (P-d1) and (P-d2) have the same meaning as L, $L^1$, $R^1$ to $R^3$, $X_1^-$, and $Z^1$ in General Formula (2), respectively, and the preferable ranges thereof are also the same. Here, * represents the portion to which L is bonded.

The ion-exchange polymer of the present invention has the units b and c, among the above-described units, as essential structural units.

In General Formulas (1) and (2), b1 or b2 in the unit b is 0.240 to 0.990, and c1 or c2 in the unit c is 0.001 to 0.100 in both General Formulas (1) and (2).

On the other hand, the unit a and the unit d are not essential, but, the upper limit of a1, a2, or d2 in these units is limited, and a1 or a2 in the unit a is 0.000 to 0.750 in both General Formulas (1) and (2).

In addition, the structure represented by General Formula (2) is formed by adding the unit d to the structure represented by General Formula (1), and d2 in the unit d is 0.000 to 0.100.

In General Formulas (1) and (2), c1 or c2 in the unit c which most contributes to the effects of the present invention, in particular, the durability with respect to chlorine is preferably 0.005 to 0.075 and more preferably 0.015 to 0.050.

Moreover, a case where c1 or c2 is 0.015 to 0.050 and b1 or b2 is 0.700 to 0.980 is still more preferable.

Specifically, in each unit in General Formula (1), a1 is 0.000 to 0.750 and preferably 0.000 to 0.500, b1 is preferably 0.500 to 0.990 and more preferably 0.700 to 0.980, and c1 is preferably 0.005 to 0.075 and more preferably 0.015 to 0.050.

In General Formula (2), a2 is preferably 0.000 to 0.750 and more preferably 0.000 to 0.500, b2 is preferably 0.500 to 0.990 and more preferably 0.700 to 0.980, c2 is preferably 0.005 to 0.075 and more preferably 0.015 to 0.050, and d2 is preferably 0.005 to 0.090 and more preferably 0.015 to 0.070.

Each unit in the structure represented by General Formula (1) or (2) will be described below.

(Unit a)

The unit a is not an essential structural unit in the ion-exchange polymer of the present invention, but is a unit which plays an auxiliary function to adjust the characteristics of the ion-exchange polymer, together with the units b and c. Accordingly, the upper limit of the unit a is specified as a1 and a2 such that the unit a does not interfere the functions which the units b and c play.

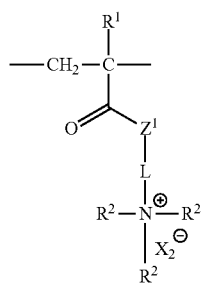

unit a

In the unit a, $R^1$, $R^2$, $X_2^-$, L, and $Z^1$ have the same meaning as $R^1$, $R^2$, $X_2^-$, L, and $Z^1$ in General Formula (1), respectively, and the preferable ranges thereof are also the same.

The unit a and the substituents in General Formulas (1) and (2) will be described.

Moreover, in the same manner, also in description of the units b, c, and d, the substituents in General Formulas (1) and (2) will be collectively described.

The number of carbon atoms of the alkyl group represented by $R^1$ is preferably 1 to 3, more preferably 1 or 2, and still more preferably 1. Examples of the alkyl group include a methyl group, an ethyl group, a propyl group, and an isopropyl group, and a methyl group is preferable.

$R^1$ is preferably a hydrogen atom.

Three $R^2$'s with which the nitrogen atom has been substituted are present, but if $R^2$ is an alkyl group or an allyl group, $R^2$'s may be the same as or different from each other, and in the present invention, $R^2$'s are preferably the same. Here, in the case of an allyl group, only one among three $R^2$'s is preferably an allyl group.

The number of carbon atoms of the alkyl group represented by $R^2$ is preferably 1 to 9, more preferably 1 to 3, still more preferably 1 or 2, and particularly preferably 1. Examples of the alkyl group include a methyl group, an ethyl group, a propyl group, an isopropyl group, a hexyl group, a pentyl group, an octyl group, and a nonyl group, and a methyl group, an ethyl group, a propyl group, or an isopropyl group is preferable, a methyl group or an ethyl group is more preferable, and among these, a methyl group is preferable.

$X_2^-$ may be any inorganic anion or an organic anion, but an inorganic anion is preferable than an organic anion.

As the inorganic anion, a halogen anion is preferable, a chlorine anion, a bromine anion, or iodine anion is preferable, and a chlorine anion or a bromine anion is more preferable.

As the organic anion, an organic carboxylate ion and an organic sulfonate ion are exemplified, and for example, an acetate anion and a methanesulfonate anion are exemplified, and an acetate anion is preferable.

The number of carbon atoms of the alkylene group represented by L is preferably 1 to 9, more preferably 2 to 8, still more preferably 3 to 8, and particularly preferably 3 to 5. Examples of the alkylene group include a methylene group, an ethylene group, a trimethylene group, a tetramethylene group, a hexamethylene group, an octamethylene group, and a nonamethylene group.

$Z^1$ represents —O— or —NRa—, and —NRa— is preferable.

Here, Ra represents a hydrogen atom or an alkyl group, and as the alkyl group, the same group as the alkyl group represented by $R^2$ is exemplified, and the preferable range thereof is also the same.

Ra is preferably a hydrogen atom.

(Unit b)

The unit b is an essential structural unit in the ion-exchange polymer of the present invention, and is essential to exhibit the effects of the present invention. The unit b is incorporated into two places in the polymer chain in the ion-exchange polymers. Due to this, the crosslinkability of the polymer is enhanced, and as a result, the crosslinking density is improved.

In addition, in the unit b, two ammonium groups are incorporated into the crosslinked chain, and the anion exchange properties are enhanced.

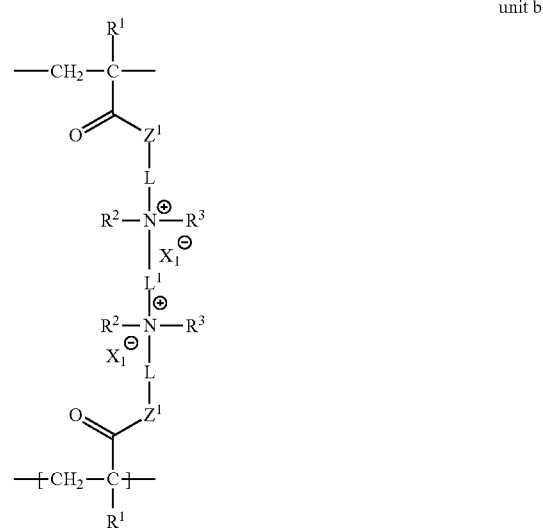

unit b

In the unit b, $R^1$, $R^2$, L, and $Z^1$ have the same meaning as $R^1$, $R^2$, L, and $Z^1$ in the unit a, respectively, and the preferable ranges thereof are also the same. $R^3$ has the same meaning as $R^2$, and the preferable range thereof is also the same. In addition, $X_1^-$ has the same meaning as $X_2^-$ in the unit a, and the preferable range thereof is also the same. $L^1$ represents a divalent linking group.

The divalent linking group represented by $L^1$ is preferably an alkylene group, an arylene group, —$N^+(R^2)(R^3)$—, —NHC(=O)—, —C(=O)NH—, or a divalent linking group formed by combing these, more preferably an alkylene group, a group formed by combining an alkylene group and an arylene group, alkylene-arylene-alkylene-$N^+(R^2)(R^3)$-alkylene-NHC(=O)-alkylene, or alkylene-$N^+(R^2)(R^3)$-alkylene-NHC(=O)-alkylene, and still more preferably a group formed by combining an alkylene group and an arylene group, or alkylene-arylene-alkylene-$N^+(R^2)(R^3)$-alkylene-NHC(=O)-alkylene. Here, $R^2$ and $R^3$ have the same meaning as $R^2$ and $R^3$ in the unit b, respectively, and the preferable ranges thereof are also the same.

The number of carbon atoms of the alkylene group is preferably 1 to 9, more preferably 2 to 8, still more preferably 3 to 8, and particularly preferably 3 to 5. Examples of the alkylene group include a methylene group, an ethylene group, a trimethylene group, a tetramethylene group, a hexamethylene group, an octamethylene group, and a nonamethylene group.

Examples of the arylene group include a phenylene group and a naphthylene group, and the number of carbon atoms is preferably 6 to 12.

Examples of the group formed by combining an alkylene group and an arylene group include an alkylene-arylene-alkylene group, and methylenephenylenemethylene is preferable.

(Unit c)

The unit c, like the unit b, is an essential structural unit in the ion-exchange polymer of the present invention. The unit c plays an important role in exhibiting the effects of the present invention, together with the unit b.

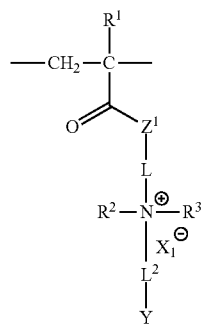

unit c

In the unit c, $R^1$ to $R^3$, $X_1^-$, L, and $Z^1$ have the same meaning as $R^1$ to $R^3$, $X_1^-$, L, and $Z^1$ in the unit b, respectively, and the preferable ranges thereof are also the same. $L^2$ represents a divalent linking group. Y represents a halogen atom.

Examples of the divalent linking group represented by $L^2$ include the linking groups exemplified as $L^1$ in the unit b, and the preferable range thereof is also the same.

As the halogen atom represented by Y, a chlorine atom, a bromine atom, or an iodine atom is preferable, a chlorine atom or a bromine atom is more preferable, and among these, a bromine atom is preferable.

(Unit d)

The unit d is not an essential structural unit in the ion-exchange polymer of the present invention, but is a unit which plays an auxiliary function to adjust the characteristics of the ion-exchange polymer, together with the units b and c. Accordingly, the upper limit of the unit d is specified as d2 such that the unit d does not interfere the functions which the units b and c play.

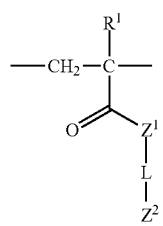

unit d

In the unit d, $R^1$, L, and $Z^1$ have the same meaning as $R^1$, L, and $Z^1$ in the unit b, respectively, and the preferable ranges thereof are also the same. $Z^2$ represents the group represented by General Formula (P-d1) or (P-d2), and these groups in $Z^2$ may be present alone or may be present in a mixed manner.

Here, in General Formulas P-d1) and (P-d2), $R^1$ to $R^3$, $X_1^-$, L, $L^1$, and $Z^1$ have the same meaning as $R^1$ to $R^3$, $X_1^-$, L, $L^1$, and $Z^1$ in the unit b, respectively, and the preferable ranges thereof are also the same.

Here, in $Z^2$, in a case where the group represented by General Formula P-d1) and the group represented by General Formula (P-d2) are present in a mixed manner, d2 in General Formula (2) is the total value of these, and satisfies the requirements of d2 in General Formula (2).

General Formulas (1) and (2), or each group in the units a to d configuring these general formulas may be further substituted with a substituent, and in the present invention, in particular, the divalent linking group represented by $L^1$ is preferably not substituted with a substituent which is easily hydrated or hydrogen-bonded to water such as a hydroxy group or an alkoxy group.

Here, in the case of being further substituted with a substituent, as the substituent, the following substituent group α is exemplified.

(Substituent Group α)

Here, the substituent group α will be described.

Substituent Group α:

an alkyl group (preferably an alkyl group having 1 to 30 carbon atoms, more preferably an alkyl group having 1 to 20 carbon atoms, and particularly preferably an alkyl group having 1 to 10 carbon atoms, and examples thereof include a methyl group, an ethyl group, an isopropyl group, a t-butyl group, an n-octyl group, a 2-ethylhexyl group, an n-decyl group, and an n-hexadecyl group), a cycloalkyl group (preferably a cycloalkyl group having 3 to 30 carbon atoms, more preferably a cycloalkyl group having 3 to 20 carbon atoms, and particularly preferably a cycloalkyl group having 3 to 10 carbon atoms, and examples thereof include a cyclopropyl group, a cyclopentyl group, and a cyclohexyl group), an alkenyl group (preferably an alkenyl group having 2 to 30 carbon atoms, more preferably an alkenyl group having 2 to 20 carbon atoms, and particularly preferably an alkenyl group having 2 to 10 carbon atoms, and examples thereof include a vinyl group, an allyl group, a 2-butenyl group, and a 3-pentenyl group), an alkynyl group (preferably an alkynyl group having 2 to 30 carbon atoms, more preferably an alkynyl group having 2 to 20 carbon atoms, and particularly preferably an alkynyl group having 2 to 10 carbon atoms, and examples thereof include a propargyl group and a 3-pentynyl group), an aryl group (preferably an aryl group having 6 to 30 carbon atoms, more preferably an aryl group having 6 to 20 carbon atoms, and particularly preferably an aryl group having 6 to 12 carbon atoms, and examples thereof include a phenyl group, a p-methylphenyl group, a naphthyl group, and an anthranyl group), an amino group (including an amino group, an alkylamino group, and an arylamino group, preferably an amino group having 0 to 30 carbon atoms, more preferably an amino group having 0 to 20 carbon atoms, and particularly preferably an amino group having 0 to 10 carbon atoms, and examples thereof include an amino group, a methylamino group, a dimethylamino group, a diethylamino group, a dibenzylamino group, a diphenylamino group, and a ditolylamino group), an alkoxy group (preferably an alkoxy group having 1 to 30 carbon atoms, more preferably an alkoxy group having 1 to 20 carbon atoms, and particularly preferably an alkoxy group having 1 to 10 carbon atoms, and examples thereof include a methoxy group, an ethoxy group, a butoxy group, and a 2-ethylhexyloxy group), an aryloxy group (preferably an aryloxy group having 6 to 30 carbon atoms, more preferably an aryloxy group having 6 to 20 carbon atoms, and particularly preferably an aryloxy group having 6 to 12 carbon atoms, and examples thereof include a phenyloxy group, a 1-naphthyloxy group, and a 2-naphthyloxy group), a heterocyclic oxy group (preferably a heterocyclic oxy group having 2 to 30 carbon atoms, more preferably a heterocyclic oxy group having 2 to 20 carbon atoms, and particularly preferably a heterocyclic oxy group having 2 to 12 carbon atoms, and examples thereof include a pyridyloxy group, a pyrazyloxy group, a pyrimidyloxy group, and a quinolyloxy group), an acyl group (preferably an acyl group having 1 to 30 carbon atoms, more preferably an acyl group having 1 to 20 carbon atoms, and particularly preferably an acyl group having 1 to 12 carbon atoms, and examples thereof include an acetyl group, a benzoyl group, a formyl group, and a pivaloyl group), an alkoxycarbonyl group (preferably an alkoxycarbonyl group having 2 to 30 carbon atoms, more preferably an alkoxycarbonyl group having 2 to 20 carbon atoms, and particularly preferably an alkoxycarbonyl group having 2 to 12 carbon atoms, and examples thereof include a methoxycarbonyl group and an ethoxycarbonyl group), an aryloxycarbonyl group (preferably an aryloxycarbonyl group having 7 to 30 carbon atoms, more preferably an aryloxycarbonyl group having 7 to 20 carbon atoms, and particularly preferably an aryloxycarbonyl group having 7 to 12 carbon atoms, and examples thereof include a phenyloxycarbonyl group), an acyloxy group (preferably an acyloxy group having 2 to 30 carbon atoms, more preferably an acyloxy group having 2 to 20 carbon atoms, and particularly preferably an acyloxy group having 2 to 10 carbon atoms, and examples thereof include an acetoxy group and a benzoyloxy group), an acylamino group (preferably an acylamino group having 2 to 30 carbon atoms, more preferably an acylamino group having 2 to 20 carbon atoms, and particularly preferably an acylamino group having 2 to 10 carbon atoms, and examples thereof include an acetylamino group and a benzoylamino group), an alkoxycarbonylamino group (preferably an alkoxycarbonylamino group having 2 to 30 carbon atoms, more preferably an alkoxycarbonylamino group having 2 to 20 carbon atoms, and particularly preferably an alkoxycarbonylamino group having 2 to 12 carbon atoms, and examples thereof include a methoxycarbonylamino group), an aryloxycarbonylamino group (preferably an aryloxycarbonylamino group having 7 to 30 carbon atoms, more preferably an aryloxycarbonylamino group having 7 to 20 carbon atoms, and particularly preferably an aryloxycarbonylamino group having 7 to 12 carbon atoms, and examples thereof include a phenyloxycarbonylamino group), an alkyl or aryl sulfonylamino group (preferably having 1 to 30 carbon atoms, more preferably having 1 to 20 carbon atoms, and particularly preferably having 1 to 12 carbon atoms, and examples thereof include a methanesulfonylamino group, a benzenesulfonylamino group), a sulfamoyl group (including a sulfamoyl group and an alkyl or aryl sulfamoyl group, preferably a sulfamoyl group having 0 to 30 carbon atoms, more preferably a sulfamoyl group having 0 to 20 carbon atoms, and particularly preferably a sulfamoyl group having 0 to 12 carbon atoms, and examples thereof include a sulfamoyl group, a methylsulfamoyl group, a dimethylsulfamoyl group, and a phenylsulfamoyl group), a carbamoyl groups (including a carbamoyl group, an alkyl or aryl carbamoyl group, preferably a carbamoyl group having 1 to 30 carbon atoms, more preferably a carbamoyl group having 1 to 20 carbon atoms, and particularly preferably a carbamoyl group having 1 to 12 carbon atoms, and examples thereof include a carbamoyl group, a methylcarbamoyl group, a diethylcarbamoyl group, and a phenylcarbamoyl group), an alkylthio group (preferably an alkylthio group having 1 to 30 carbon atoms, more preferably an alkylthio group having 1 to 20 carbon atoms, and particularly preferably an alkylthio group having 1 to 12 carbon atoms, and examples thereof include a methylthio group and an ethylthio group), an arylthio group (preferably an arylthio group having 6 to 30 carbon atoms, more preferably an arylthio group having 6 to 20 carbon atoms, and particularly preferably an arylthio group having 6 to 12 carbon atoms, and examples thereof include a phenylthio group), an heterocyclic thio group (preferably a heterocyclic thio group having 2 to 30 carbon atoms, more preferably a heterocyclic thio group having 2 to 20 carbon atoms, and particularly preferably a heterocyclic thio group having 2 to 12 carbon atoms, and examples thereof include a pyridylthio group, a 2-benzimidazolylthio group, a 2-benzoxazolylthio group, and a 2-benzothiazolylthio group), an alkyl or aryl sulfonyl group (preferably an alkyl or aryl sulfonyl group having 1 to 30 carbon atoms, more preferably an alkyl or aryl sulfonyl group having 1 to 20 carbon atoms, and particularly preferably an alkyl or aryl sulfonyl group having 1 to 12 carbon atoms, and examples thereof include a mesyl group and a tosyl group), an alkyl or aryl sulfinyl group (preferably an alkyl or aryl sulfinyl group having 1 to 30 carbon atoms, more preferably an alkyl or aryl sulfinyl group having 1 to 20 carbon atoms, and particularly preferably an alkyl or aryl sulfinyl group having 1 to 12 carbon atoms, and examples thereof include a methanesulfinyl group and a benzenesulfinyl group), a ureido group (preferably a ureido group having 1 to 30 carbon atoms, more preferably a ureido group having 1 to 20 carbon atoms, and particularly preferably a ureido groups having 1 to 12 carbon atoms, and examples thereof include a ureido group, a methylureido group, and a phenylureido group), a phosphoric amide group (preferably a phosphoric amide group having 1 to 30 carbon atoms, more preferably a phosphoric amide group having 1 to 20 carbon atoms, and particularly preferably a phosphoric amide group having 1 to 12 carbon atoms, and examples thereof include a diethylphosphoric amide group and a phenylphosphoric amide group), a hydroxy group, a mercapto group, a halogen atom (for example, a fluorine atom, a chlorine atom, a bromine atom, and an iodine atom, and more preferably a fluorine atom), a cyano group, a sulfo group, a carboxyl group, an oxo group, a nitro group, a hydroxamic acid group, a sulfino group, a hydrazino group, an imino group, a heterocyclic group (preferably a heterocyclic group having 1 to 30 carbon atoms and more preferably a heterocyclic group having 1 to 12 carbon atoms, and as a heterocyclic atom configuring a ring structure, a nitrogen atom, an oxygen atom, or a sulfur atom is preferable, and specific examples thereof include an imidazolyl group, a pyridyl group, a quinolyl group, a furyl group, a thienyl group, a piperidyl group, a morpholino group, a benzoxazolyl group, a benzimidazolyl group, a benzothiazolyl group, a carbazolyl group, and an azepinyl group), a silyl group (preferably a silyl group having 3 to 40 carbon atoms, more preferably a silyl group having 3 to 30 carbon atoms, and particularly preferably a silyl group having 3 to 24 carbon atoms, and examples thereof include a trimethylsilyl group and a triphenylsilyl group), and a silyloxy group (preferably a silyloxy group having 3 to 40 carbon atoms, more preferably a silyloxy group having 3 to 30 carbon atoms, and particularly preferably a silyloxy group having 3 to 24 carbon atoms, and examples thereof include a trimethylsilyloxy group and a triphenylsilyloxy group).

These substituents may be further substituted with any one or more substituents selected from the above substituent group α.

Moreover, in the present invention, when there are a plurality of substituents in one structural portion, these substituents may be linked to each other to form a ring, or may be condensed with a part or all of the structural portion to form an aromatic ring or an unsaturated heterocycle.

<<Composition for Production of Ion-Exchange Polymer>>

The ion-exchange polymer of the present invention can be produced by using a composition (hereinafter, also simply referred to as a composition of the present invention or simply a composition) for production of an ion-exchange polymer containing a compound represented by the following General Formula (M-b), a compound represented by the following General Formula (M-c), a water-soluble solvent, and a polymerization inhibitor. The composition for production of an ion-exchange polymer preferably contains a compound represented by the following General Formula (M-a).

The ion-exchange polymer of the present invention includes the structure represented by General Formula (1) or (2), these are configured of the units a to d, and among these, the units b and c are essential units.

To form these units, a polymerizable compound is contained in the composition.

<Compound Represented by General Formula (M-a)>

The unit a is an effective unit for performance adjustment of an ion-exchange polymer, but is not essential. To obtain the unit a, a compound represented by the following General Formula (M-a) is preferably contained in the composition.

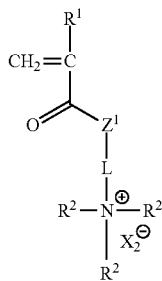

General Formula (M-a)

In General Formula (M-a), $R^1$, $R^2$, L, $X_2^-$ and $Z^1$ have the same meaning as $R^1$, $R^2$, L, $X_2^-$, and $Z^1$ in the unit a, respectively, and the preferable ranges thereof are also the same.

Specific examples of the compound represented by General Formula (M-a) are shown below, but the present invention is not limited thereto.

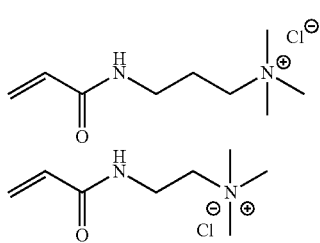

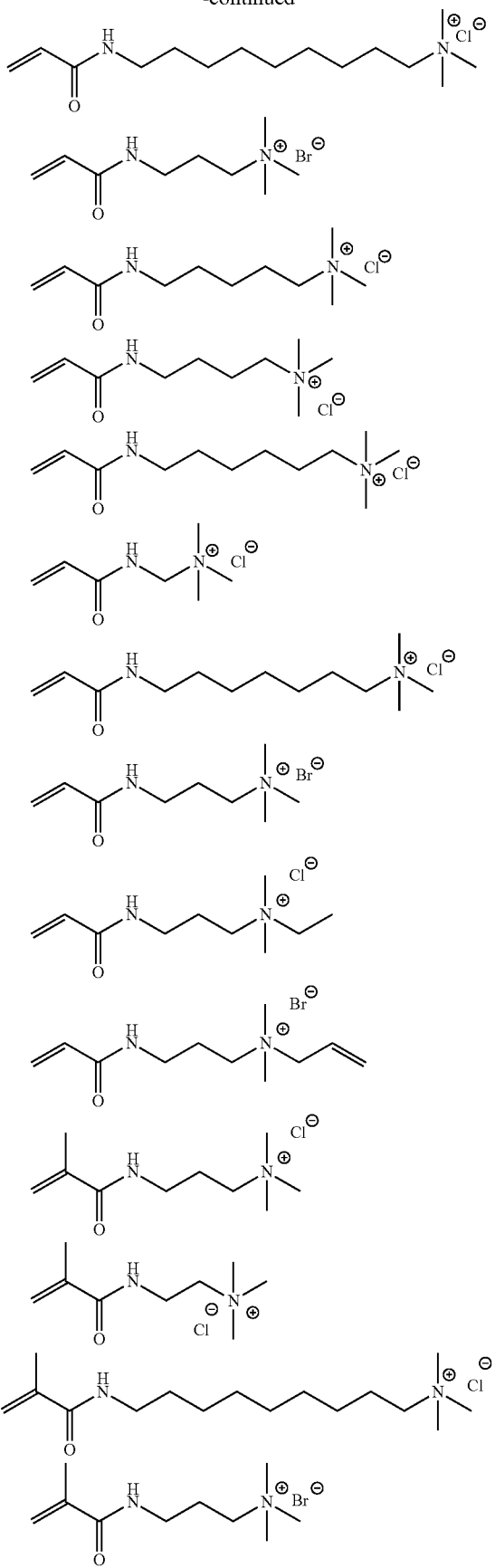

-continued

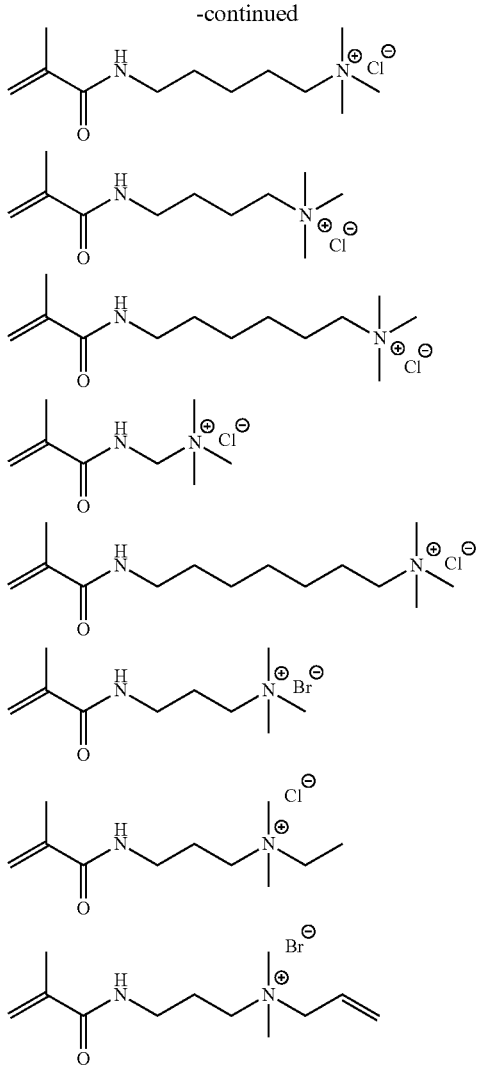

The total solid content of the compound represented by General Formula (M-a) with respect to the total amount of the composition is preferably 40% by mass or less, more preferably 30% by mass or less, and still more preferably 20% by mass or less.

<Compound Represented by General Formula (M-b)>

To obtain the unit b, a compound represented by the following General Formula (M-b) is used. Since the compound represented by General Formula (M-b) has two polymerizable groups, the compound plays a role as a crosslinking agent, and since the compound has an ionic group, the compound is called a charged crosslinker.

General Formula (M-b)

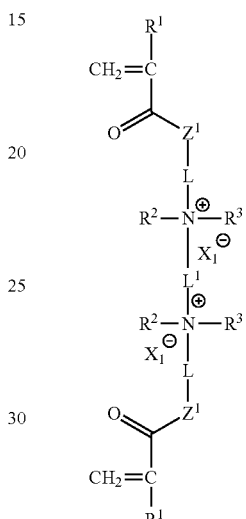

In General Formula (M-b), $R^1$ to $R^3$, L, $L^1$, $X_1^-$, and $Z^1$ have the same meaning as $R^1$ to $R^3$, L, $L^1$, $X_1^-$, and $Z^1$ in the unit b, respectively, and the preferable ranges thereof are also the same.

Specific examples of the compound represented by General Formula (M-b) are shown below, but the present invention is not limited thereto.

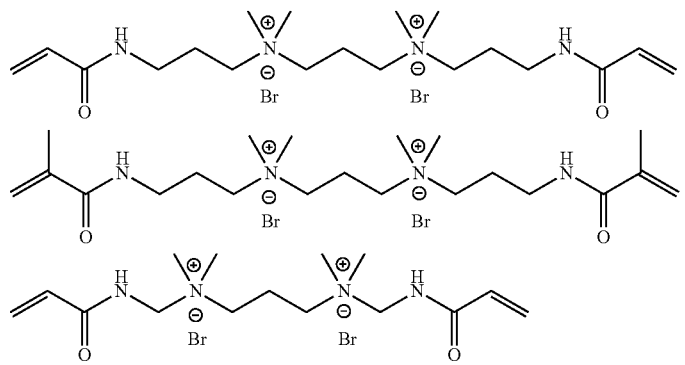

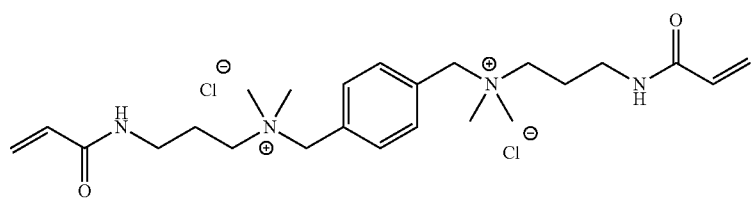

-continued
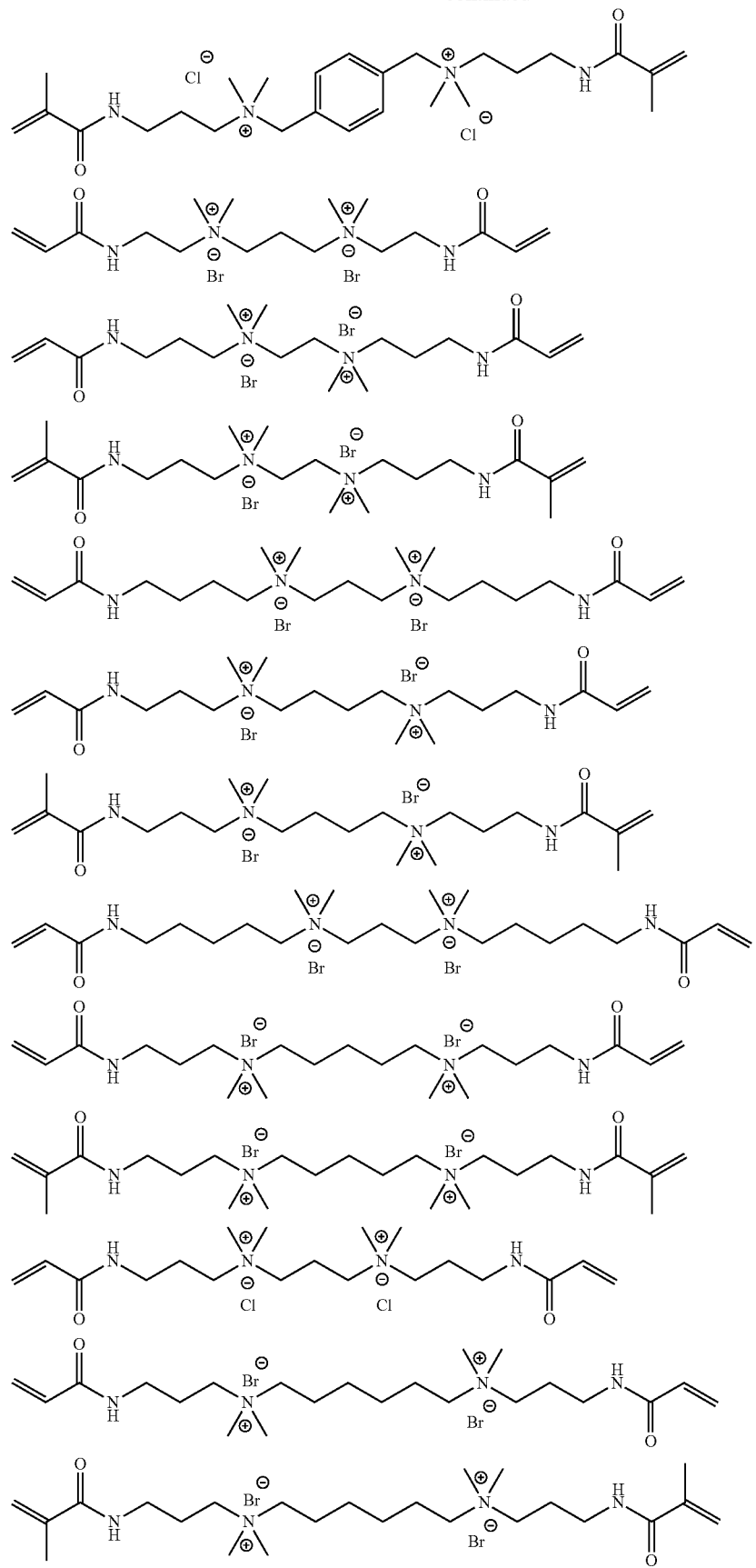

-continued
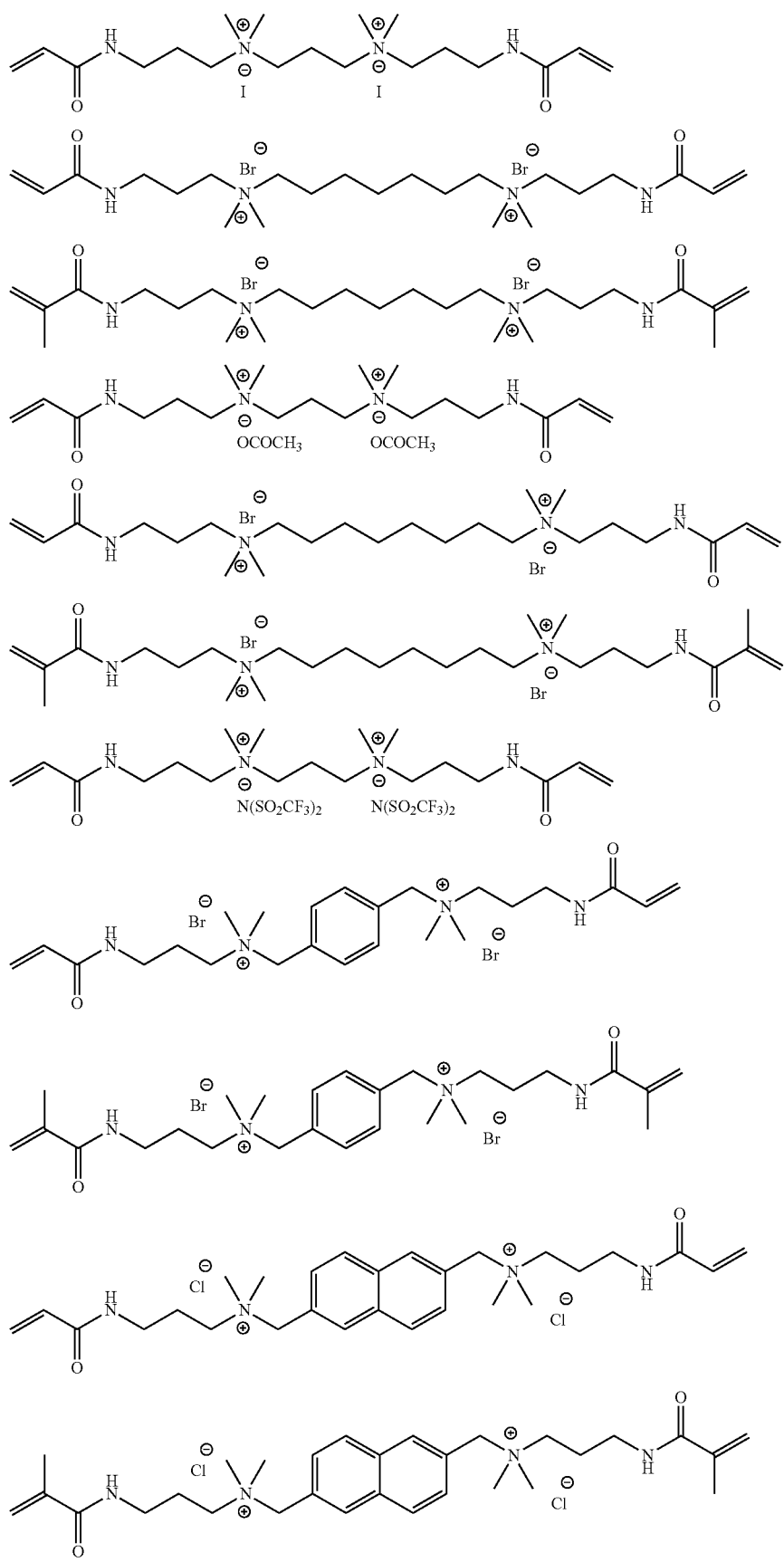

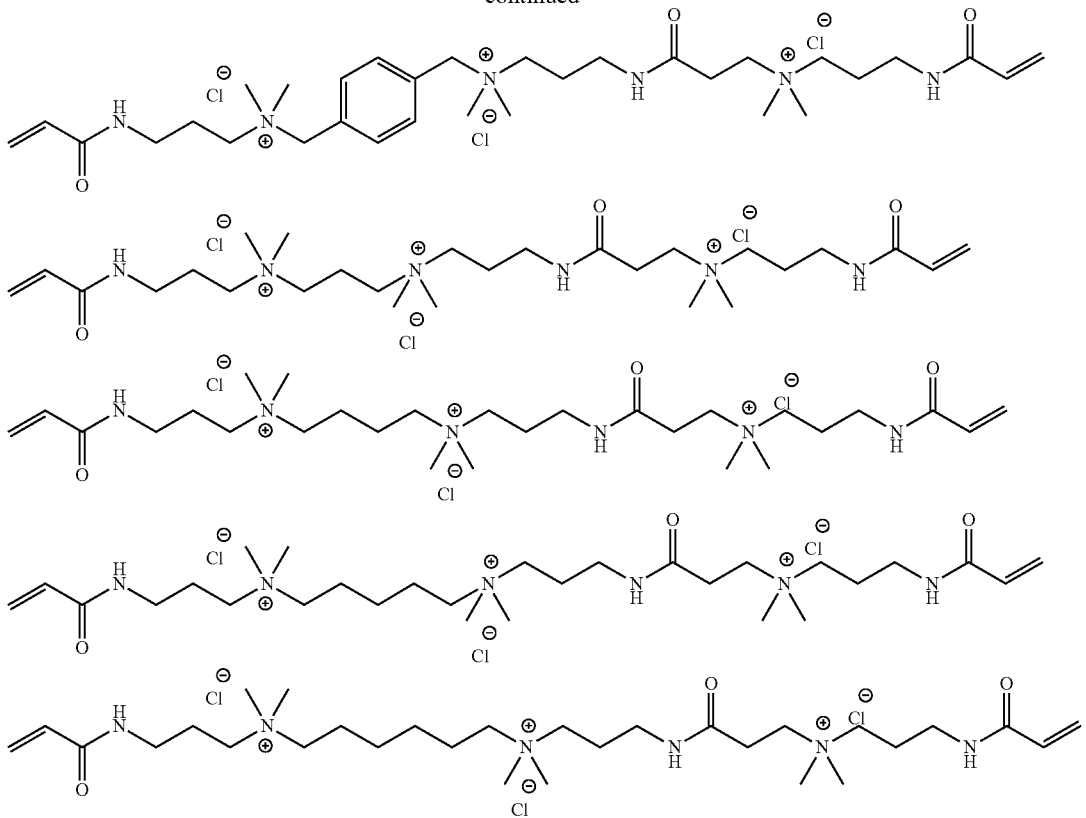

The total solid content of the compound represented by General Formula (M-b) with respect to the total amount of the composition is preferably 30% by mass to 99% by mass, more preferably 40% by mass to 98% by mass, still more preferably 45% by mass to 98% by mass, and particularly preferably 50% by mass to 98% by mass, and most preferably 60% by mass to 98% by mass.

<Compound Represented by General Formula (M-c)>

In combination with the compound represented by General Formula (M-b), a compound represented by the following General Formula (M-c) is contained in the composition.

The compound represented by General Formula (M-c) is used for obtaining the unit c of the structure represented by General Formula (1) or (2).

General Formula (M-c)

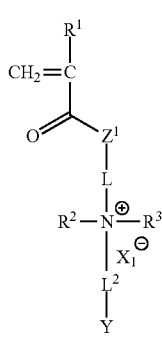

In General Formula (M-c), $R^1$ to $R^3$, L, $L^2$, $X_1^-$, $Z^1$, and Y have the same meaning as $R^1$ to $R^3$, L, $L^2$, $X_1^-$, $Z^1$, and Y in the unit c, respectively, and the preferable ranges thereof are also the same.

Specific examples of the compound represented by General Formula (M-c) are shown below, but the present invention is not limited thereto.

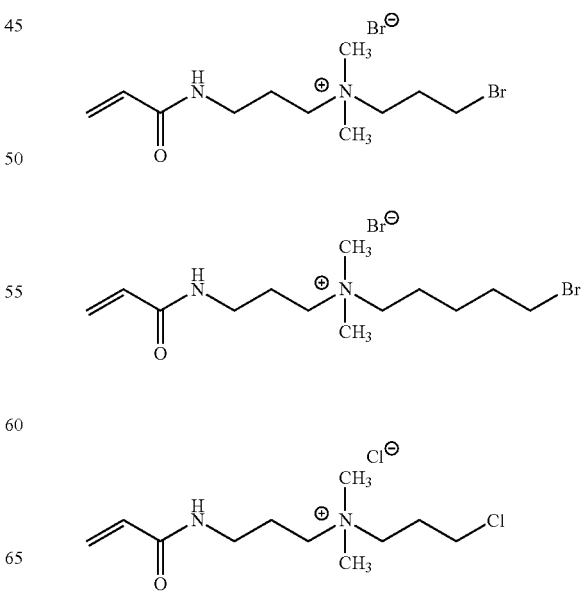

-continued

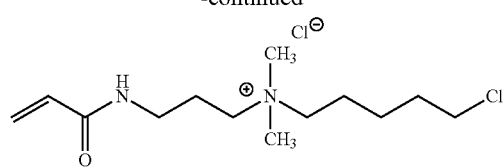
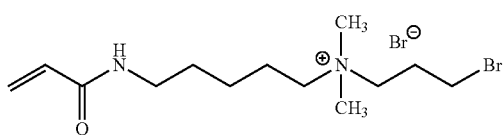
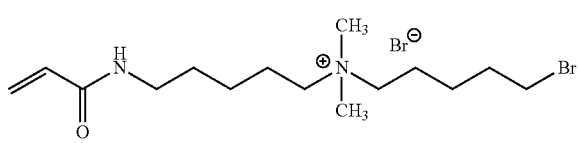
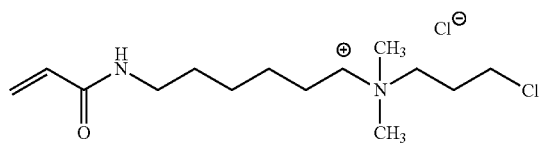
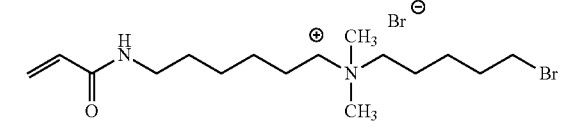
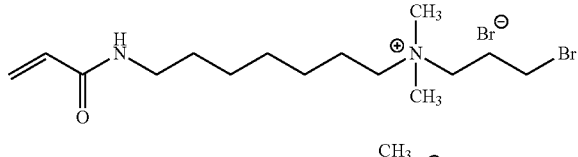
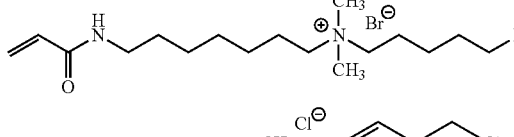
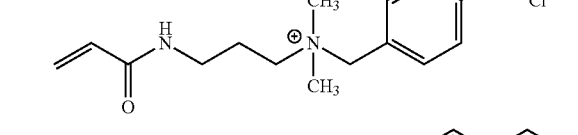
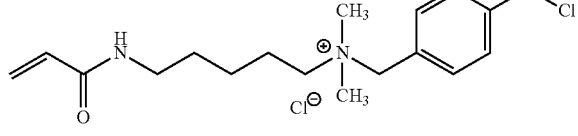
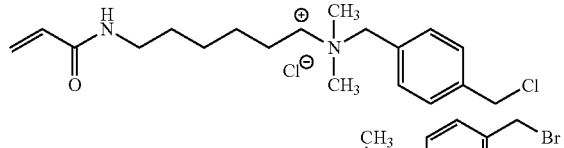
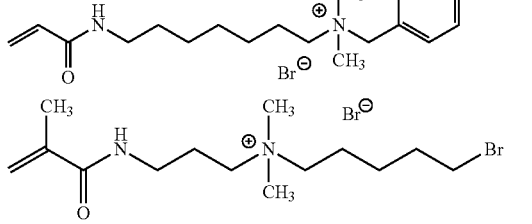

-continued

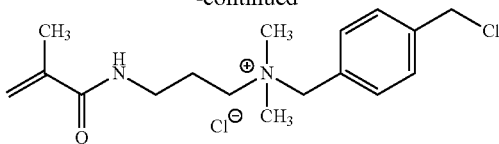

The compound represented by General Formula (M-c) can be synthesized by reacting a compound represented by the following General Formula (M-d2) with a compound represented by the following General Formula (L-c).

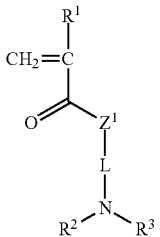

General Formula (M-d2)

In General Formula (M-d2), $R^1$ to $R^3$, L, and $Z^1$ have the same meaning as $R^1$ to $R^3$, L, and $Z^1$ in General Formula (M-c), respectively, and the preferable ranges thereof are also the same.

$$Y^a\text{-}L^2\text{-}Y \quad \text{General Formula (L-c)}$$

In General Formula (L-c), $L^2$ represents a divalent linking group, Y and $Y^a$ each independently represent a halogen atom.

$L^2$ and Y have the same meaning as $L^2$ and Y in the unit c, respectively, and the preferable ranges thereof are also the same.

$Y^a$ has the same meaning as Y, and the preferable range thereof is also the same. Moreover, $Y^a$ and Y may be the same as or different from each other.

Here, by the compound represented by General Formula (M-d2), the unit d in which $Z^2$ in the unit d represented by General Formula (2) is the group represented by General Formula (P-d2) can be obtained. Thus, the compound represented by General Formula (M-d2) is preferably contained in the composition.

Specific examples of the compound represented by General Formula (M-d2) are shown below, but the present invention is not limited thereto.

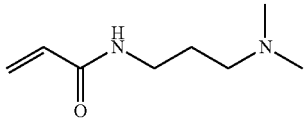
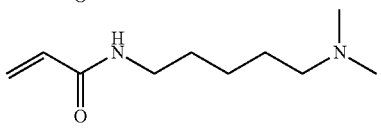
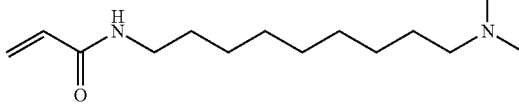

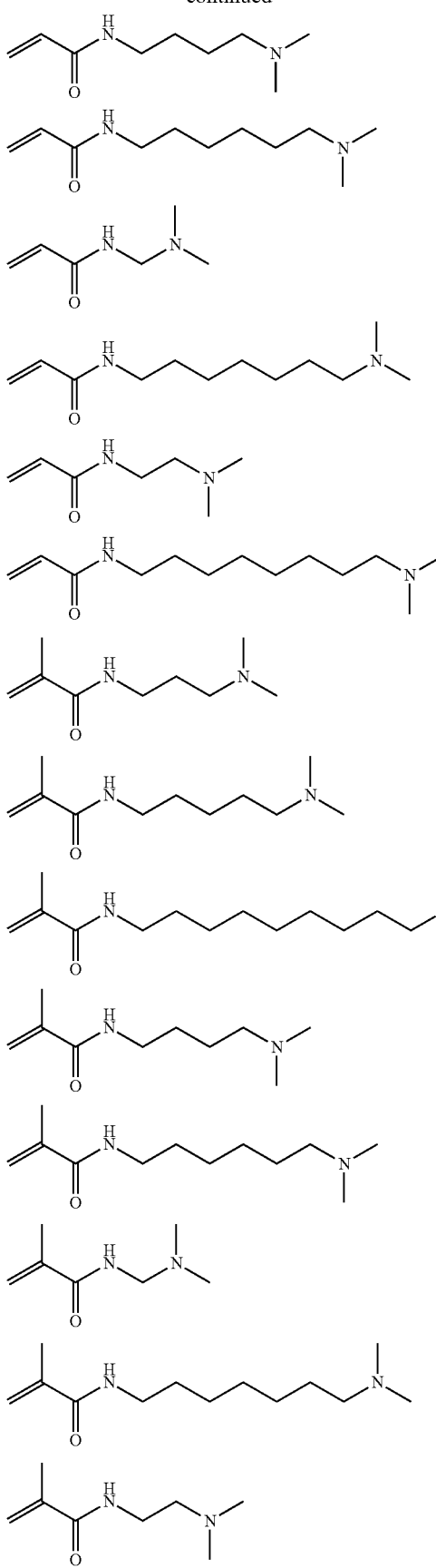

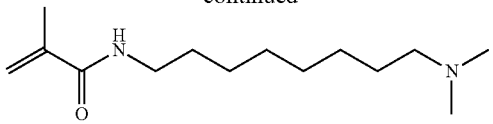

Specific examples of the compound represented by General Formula (L-c) are shown below, but the present invention is not limited thereto.

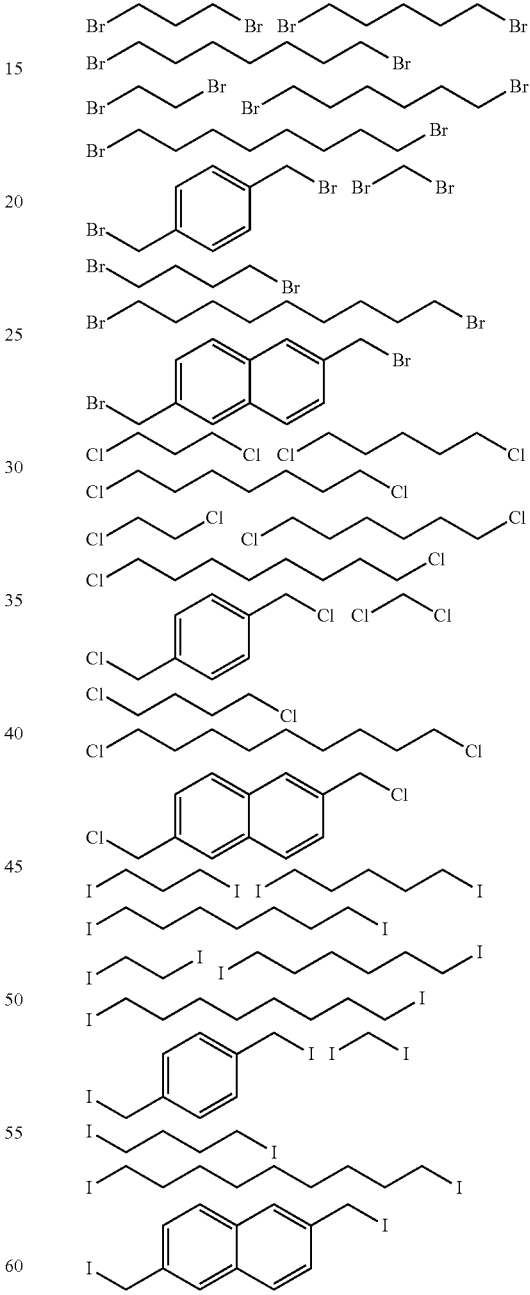

In the present invention, the compound represented by General Formula (M-d2) is preferably contained in the composition, and in combination with this or alone, the compound represented by General Formula (L-c) is also preferably contained.

The compound represented by General Formula (M-b) is preferably included in 25.0 mol % to 99.0 mol %, and more preferably included in 50.0 mol % to 98.0 mol %, with respect to the entire monomer components in the polymer obtained by polymerizing and curing.

The content of a compound represented by General Formula (M-d2) is preferably 0.1 moles to 10 moles, more preferably 0.1 moles to 5.0 moles, and still more preferably 0.1 moles to 3.0 moles, with respect to 100 moles of the compound represented by General Formula (M-b).

The content of a compound represented by General Formula (L-c) is preferably 0.1 moles to 1.0 mole, more preferably 0.1 moles to 0.5 moles, and still more preferably 0.1 moles to 0.3 moles, with respect to 100 moles of the compound represented by General Formula (M-b).

In addition, the content of a compound represented by General Formula (L-c) is preferably 0.1 moles to 10 moles, more preferably 0.1 moles to 5.0 moles, and still more preferably 0.1 moles to 1.0 mole, with respect to 100 moles of the compound represented by General Formula (M-d2).

Moreover, in the present invention, by the compound represented by General Formula (M-d2) and the compound represented by General Formula (L-c) being contained in the composition, in the composition, the unit c or d of the structure represented by General Formula (2) can also be obtained.

The composition of the present invention may further include a monomer compound different from these.

<Solvent>

The composition of the present invention may include a solvent. The content of the solvent in the composition is preferably 5% by mass to 35% by mass, more preferably 10% by mass to 35% by mass, and still more preferably 10% by mass to 27% by mass, with respect to the total amount of the composition.

That is, the composition of the present invention is preferably a solution.

By including a solvent, a polymerization and curing reaction proceeds uniformly and smoothly. In addition, in a case where a porous support is impregnated with the composition, the impregnation proceeds smoothly.

As the solvent, water, or a mixed solvent of water and a solvent having a solubility with respect to water of 5% by mass or greater are preferably used, and the solvent is preferably freely mixed with water. Thus, a solvent selected from water and an water-soluble solvent is preferable.

As the water-soluble solvent, in particular, an alcohol-based solvent, or an ether-based solvent, an amide-based solvent, a ketone-based solvent, a sulfoxide-based solvent, a sulfone-based solvent, a nitrile-based solvent, or an organic phosphorus-based solvent, which is an aprotic polar solvent, is preferable.

Examples of the alcohol-based solvent include methanol, ethanol, isopropanol, n-butanol, ethylene glycol, propylene glycol, diethylene glycol, and dipropylene glycol. These can be used alone or in combination of two or more types thereof.

In addition, preferable examples of the aprotic polar solvent include dimethyl sulfoxide, dimethyl imidazolidinone, sulfolane, N-methyl pyrrolidone, dimethyl formamide, acetonitrile, acetone, dioxane, tetramethyl urea, hexamethyl phosphoramide, hexamethyl phosphorotriamide, pyridine, propionitrile, butanone, cyclohexanone, tetrahydrofuran, tetrahydropyran, ethylene glycol diacetate, and γ-butyrolactone, and among these, dimethyl sulfoxide, N-methyl pyrrolidone, dimethyl formamide, dimethyl imidazolidinone, sulfolane, acetone, acetonitrile, or tetrahydrofuran is preferable. These can be used alone or in combination of two or more types thereof.

In the present invention, in a case where a solvent is included, the content of the compound represented by General Formula (M-b) is preferably 30 parts by mass to 99 parts by mass, more preferably 50 parts by mass to 98 parts by mass, still more preferably 60 parts by mass to 98 parts by mass, particularly preferably 70 parts by mass to 98 parts by mass, and most preferably 80 parts by mass to 98 parts by mass, with respect to 100 parts by mass of the total amount of the composition.

<Polymerization Initiator>

The composition of the present invention is preferably polymerized and cured in the presence of a polymerization initiator, and accordingly, a polymerization initiator is preferably included in the composition.

Among polymerization initiators, in the present invention, a photopolymerization initiator capable of polymerizing by irradiation with active radiation is preferable.

Examples of the photopolymerization initiator include aromatic ketones, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, a compound having a carbon halogen bond, and an alkyl amine compound.

Preferable examples of the aromatic ketones, the acylphosphine oxide compound, and the thio compound include compounds having a benzophenone skeleton or a thioxanthone skeleton described in "RADIATION CURING IN POLYMER SCIENCE AND TECHNOLOGY", pp. 77-117 (1993). More preferable examples thereof include an α-thiobenzophenone compound described in JP1972-6416B (JP-S47-6416B), a benzoin ether compound described in JP1972-3981B (JP-S47-3981B), an α-substituted benzoin compound described in JP1972-22326B (JP-S47-22326B), a benzoin derivative described in JP1972-23664B (JP-S47-23664B), an aroylphosphonic acid ester described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), α-amino benzophenones described in JP1989-34242B (JP-H01-34242B), U.S. Pat. No. 4,318,791A, and EP0284561A1, p-di(dimethylaminobenzoyl)benzene described in JP1990-211452A (JP-H02-211452A), a thio substituted aromatic ketone described in JP1986-194062A (JP-S61-194062A), an acylphosphine sulfide described in JP1990-9597B (JP-H02-9597B), an acylphosphine described in JP1990-9596B (JP-H02-9596B), thioxanthones described in JP1988-61950B (JP-S63-61950B), and coumarins described in JP1984-42864B (JP-S59-42864B). In addition, the polymerization initiators described in JP2008-105379A and JP2009-114290A are also preferable. In addition, polymerization initiators described in pp. 65 to 148 of "Ultraviolet Curing System" written by Kato Kiyomi (published by Research Center Co., Ltd., 1989) can be exemplified.

In the present invention, a water-soluble polymerization initiator is preferable.

Here, the water-soluble polymerization initiator means that 0.1% by mass or greater of the polymerization initiator dissolves in distilled water, at 25° C. The water-soluble photopolymerization initiator more preferably dissolves in 1% by mass or greater and particularly preferably in 3% by mass or greater in distilled water, at 25° C.

In the present invention, the content of the polymerization initiator is preferably 0.1 parts by mass to 10 parts by mass, more preferably 0.1 parts by mass to 5 parts by mass, and still more preferably 0.3 parts by mass to 2 parts by mass, with respect to 100 parts by mass of the total solid mass in the composition.

<Polymerization Inhibitor>

In the present invention, a polymerization inhibitor is preferably included in the composition.

As the polymerization inhibitor, any polymerization inhibitor can be used, and examples thereof include a phenol compound, a hydroquinone compound, an amine compound, a mercapto compound, and a nitroxyl radical compound.

Specific examples of the phenol compound include hindered phenol (a phenol having a tert-butyl group at an ortho-position, and representative examples thereof include 2,6-di-t-butyl-4-methylphenol) and bisphenol. Specific examples of the hydroquinone compound include monomethyl ether hydroquinone. In addition, specific examples of the amine compound include N-nitroso-N-phenylhydroxylamine and N,N-diethylhydroxylamine. Specific examples of the nitroxyl radical compound include 4-hydroxy TEMPO (4-hydroxy-2,2,6,6-tetramethylpiperidine 1-oxyl free radical).

Moreover, these polymerization inhibitors may be used alone or in combination of two or more types thereof.

The content of the polymerization inhibitor is preferably 0.01 parts by mass to 5 parts by mass, more preferably 0.01 parts by mass to 1 part by mass, and still more preferably 0.01 parts by mass to 0.5 parts by mass, with respect to 100 parts by mass of the total solid content mass in the composition.

<Other Components>

The composition of the present invention may include a surfactant, a polymer dispersant, an anti-crater agent, or the like, in addition to the above-described components.

<<Electrolyte Membrane>>

The electrolyte membrane of the present invention include at least an ion-exchange polymer of the present invention.

Among the ion-exchange polymers included in the electrolyte membrane, the ion-exchange polymer of the present invention is preferably 60 parts by mass to 99 parts by mass, more preferably 70 parts by mass to 99 parts by mass, and still more preferably 80 parts by mass to 99 parts by mass, with respect to 100 parts by mass of the entirety of ion-exchange polymers.

<Support>

To impart mechanical strength of the electrolyte membrane, a support is preferably used as a reinforcing material of the membrane. The support is preferably a porous support. By the polymerization and curing reaction after the composition is applied to the porous support and/or after the porous support is impregnated with the composition, the composition is incorporated as a membrane or a part of the membrane.

Examples of the porous support as a reinforcing material include synthetic woven fabric or synthetic non-woven fabric, a sponge-like film, and a film having fine through holes. The material for forming the porous support of the present invention can be a porous membrane based on, for example, polyolefin (polyethylene, polypropylene, or the like), polyacrylonitrile, polyvinyl chloride, polyester, polyamide, or copolymers thereof, or, for example, polysulfone, polyether sulfone, polyphenylene sulfone, polyphenylene sulfide, polyimide, polyethermide, polyamide, polyamideimide, polyacrylonitrile, polycarbonate, polyacrylate, cellulose acetate, polypropylene, poly(4-methyl-1-pentene), polyvinylidene fluoride, polytetrafluoroethylene, polyhexafluoropropylene, polychlorotrifluoroethylene, or copolymers thereof. Among these, in the present invention, polyolefin is preferable.

As the commercially available porous support and reinforcing material, products from Japan Vilene Company, Ltd., Freudenberg Filtration Technologies, or Sefar AG are commercially available.

Moreover, in the case of performing a photopolymerization and curing reaction, the porous support and the reinforcing material are required not to shield the wavelength range of the irradiation light, that is, are required to transmit irradiation light with wavelengths used in the polymerization and curing, but in the case of performing a thermal polymerization and curing reaction, there is no need to consider this point. In addition, the porous reinforcing material is preferably a material into which a coating solution of the composition for forming an electrolyte membrane can permeate.

The porous support preferably has hydrophilicity. To impart hydrophilicity to the support, a general method such as a corona treatment, an ozone treatment, a sulfuric acid treatment, or a silane coupling agent treatment can be used.

The thickness of the membrane of the present invention is preferably 30 μm to 150 μm, more preferably 60 μm to 140 μm, and particularly preferably 70 μm to 135 μm, in the case of having a support, including the support.

Here, as performed in the examples, the thickness of the membrane of the present invention is, specifically, a thickness after being stored for 12 hours in a 0.1 M NaCl solution.

<<Characteristics of Ion-Exchange Polymer or Electrolyte Membrane>>

<Charge Density>

The charge density means the amount of substance of ionic groups per unit mass.

The charge density of the ion-exchange polymer of the present invention is preferably 3.50 mmol/g to 10.00 mmol/g, more preferably 3.80 mmol/g to 10.00 mmol/g, and still more preferably 3.95 mmol/g to 10.00 mmol/g.

The charge density is determined by calculation by the following Expression (1).

$$N/M \times 1{,}000 \text{ [mmol/g]} \qquad \text{Expression (1)}$$

Here, N represents the number of ammonium groups included in the unit structure, and M represents the molecular weight of the unit structure.

The charge density can be within the above range by adjusting the content of the compound represented by General Formula (M-a) or (M-b).

<Crosslinkable Ethylene Group Density>

The crosslinkable ethylene group density means the amount of substance of polymerizable groups per unit mass.

The crosslinkable ethylene group density of the ion-exchange polymer of the present invention is preferably 0.50 mmol/g to 10.0 mmol/g, more preferably 0.60 mmol/g to 7.50 mmol/g, and still more preferably 0.70 mmol/g to 5.00 mmol/g.

The crosslinkable ethylene group density is determined by calculation by the following Expression (2).

$$(E-1)/M \times 1{,}000 \text{ [mmol/g]} \qquad \text{Expression (2)}$$

Here, E represents the number of polymerizable ethylene groups included in the unit structure, and M represents the molecular weight of the unit structure.

The crosslinkable ethylene group density can be within the above range by adjusting the content of the compound represented by General Formula (M-b).

<Water Permeability>

The water permeability of the electrolyte membrane of the present invention is preferably lower, more preferably $10.0 \times 10^{-5}$ ml/m$^2$/Pa/hr or less and still more preferably $9.0 \times 10^{-5}$ ml/m$^2$/Pa/hr or less, and in the present invention, $5.0 \times 10^{-5}$ ml/m$^2$/Pa/hr to $7.6 \times 10^{-5}$ ml/m$^2$/Pa/hr is particularly preferable.

<Permselectivity (transport number)>

The permselectivity of an anion such as Cl$^-$ in the electrolyte membrane (anion-exchange membrane) of the present invention is preferably greater than 0.90, more preferably greater than 0.93, still more preferably greater than 0.95, and particularly preferably a value close to 1.0 which is an theoretical value. In the present invention, 0.96 to 0.999 is particularly preferable.

<Electric Resistance>

The electric resistance (membrane resistance) of the electrolyte membrane of the present invention is preferably less than 2.8 Ω·cm$^2$, more preferably less than 2.0 Ω·cm$^2$, and still more preferably 1.0 Ω·cm$^2$ to 1.95 Ω·cm$^2$.

<Durability with respect to Chlorine>

The durability with respect to chlorine of the electrolyte membrane of the present invention, that is, reduction in water permeability, permselectivity, and electric resistance of the membrane in the case of being immersed in a sodium hypochlorite solution for 24 hours is preferably smaller. The ratio of decrease (reduction ratio) is preferably 15% or less, and more preferably 13% or less.

<Durability with respect to Acid and Alkali>

The electrolyte membrane of the present invention is preferable since it has excellent durability with respect to acids and alkalis, in addition to excellent durability with respect to chlorine. For example, in a case where the membrane is immersed in an acidic aqueous solution having pH 2 or an alkaline aqueous solution having pH 12 for 24 hours, the ratio of decrease (reduction ratio) in the water permeability, the permselectivity, and the electric resistance of the membrane is preferably 15% or less.

Each evaluation and measurement of water permeability, permselectivity, electric resistance, durability with respect to chlorine, acids, and alkalis can be performed by the methods shown in the examples.

<<Production Method for Ion-Exchange Polymer>>

The ion-exchange polymer of the present invention is preferably produced by polymerizing and curing the composition for production of an ion-exchange polymer of the present invention.

The composition for production of an ion-exchange polymer is preferably polymerized and cured by irradiation with active radiation.

The electrolyte membrane of the present invention include at least an ion-exchange polymer of the present invention, and the production method for the electrolyte membrane of the present invention and the production method for the ion-exchange polymer are described below.

<<Production Method for Electrolyte Membrane>>

The electrolyte membrane of the present invention can be prepared by using a fixed support by a batch type method (a batch mode), and a membrane can also be prepared by using a support which moves by a continuous type method (a continuous mode). The support may be a roll shape in which continuous rewinding is performed. Moreover, in the case of the continuous mode, a series of steps of mounting a support on the moving belt, applying the coating solution of the composition (composition for the production of an ion-exchange polymer) of the present invention, and polymerizing and curing to form a membrane can be continuously performed. Here, only one of a coating step and a membrane forming step may be continuously performed.

Moreover, separately from the support, while the composition of the present invention is immersed in a porous support and the curing reaction is completed, a temporary support (after the curing reaction ends, the membrane is peeled off from the temporary support) may be used.

In such a temporary support, it is not necessary to consider substance permeation, and for example, the temporary support may be any one as long as it includes a polyethylene terephthalate (PET) film or a metal plate such as an aluminum plate and can be fixed for formation of a membrane.

In addition, the composition of the present invention is immersed in a porous support, and can also be polymerized and cured without using a support other than the porous support.

The composition of the present invention can be applied to the porous support or immersed in the porous support by various methods, for example, curtain coating, extrusion coating, air knife coating, slide coating, nip roll coating, forward roll coating, reverse roll coating, dip coating, kiss coating, rod bar coating, and spray coating. Coating of a plurality of layers can be performed simultaneously or sequentially. In simultaneous multilayer coating, curtain coating, slide coating, slot die coating, or extrusion coating is preferable.

In the case of coating using a high speed coating machine, the viscosity of a coating solution formed of the composition of the present invention at 35° C. is preferably less than 4000 mPa·s, more preferably 1 mPa·s to 1000 mPa·s, and most preferably 1 mPa·s to 500 mPa·s. Moreover, in the case of slide bead coating, the viscosity at 35° C. is preferably 1 mPa·s to 100 mPa·s.

In a high speed coating machine, the coating solution of the composition of the present invention can be applied to a support which moves, at a speed greater than 15 m/min, and can also be applied at a speed greater than 400 m/min.

In particular, in a case where a support is used to increase the mechanical strength, before the composition of the present invention is applied to the surface of the support, a corona discharge treatment, a glow discharge treatment, a flame treatment, or an ultraviolet rays irradiation treatment is preferably performed to improve the wettability and the adhesion of the support.

The electrolyte membrane is preferably produced by a step (i) of applying the composition of the present invention to a support (preferably, a porous support) and/or impregnating the support with the composition, a step (ii) of performing a polymerization and curing reaction of the composition by irradiation with active radiation or heating, and a step (iii) of taking out the formed membrane from the support, if necessary (in particular, in the case of a temporary support).

Moreover, in the step (ii), heating may be performed in combination with irradiation with active radiation. Here, in the step (i), the support is preferably impregnated with the composition of the present invention.

In production of an electrolyte membrane in a continuous mode, a membrane is produced by continuously applying composition of the present invention to a support which moves, and more preferably, is produced by a production unit including a composition coating portion, a irradiation source for polymerizing and curing the composition, a membrane collecting portion for collecting the formed membrane, and means for moving the support from the composition coating portion to the irradiation source and the membrane collecting portion.

[Irradiation with Active Radiation]

A composition coating portion can be placed at the upstream position with respect to a irradiation source, and the irradiation source is placed at the upstream position with respect to the composite membrane collecting portion.

The polymerization and curing of the composition of the present invention is initiated preferably within 60 seconds, more preferably within 15 seconds, particularly preferably within 5 seconds, and most preferably within 3 seconds after the composition is applied to the support or after the support is impregnated with the composition.

Light irradiation for polymerization and curing is preferably performed for less than 10 seconds, more preferably for less than 5 seconds, particularly preferably for less than 3 seconds, and most preferably for less than 2 seconds. In a continuous method, irradiation is continuously performed, and in consideration of the speed at which the composition of the present invention is moved through the irradiation beam, the polymerization and curing reaction time is determined.

As the active radiation, ultraviolet rays are preferable. The irradiation wavelength is preferably compatible with the absorption wavelength of any polymerization initiator included in the composition of the present invention, and for example, is UV-A (400 nm to 320 nm), UV-B (320 nm to 280 nm), and UV-C (280 nm to 200 nm).

In a case where ultraviolet rays (UV light) having a high intensity are used in the polymerization and curing reaction, a significant amount of heat is generated, and thus, to prevent overheating, it is preferable to cool the lamp of the light source and/or the support/membrane with a cooling air. In the case of being irradiated with a significant dose of infrared light (IR light) together with a UV beam, irradiation with UV light is performed by using an IR reflecting quartz plate as a filter.

Examples of the ultraviolet light source include a mercury arc lamp, a carbon arc lamp, a low pressure mercury lamp, a medium pressure mercury lamp, a high pressure mercury lamp, a swirling flow plasma arc lamp, a metal halide lamp, a xenon lamp, a tungsten lamp, a halogen lamp, laser, and an ultraviolet ray emitting diode. A medium pressure or high pressure mercury vapor type ultraviolet ray emitting lamp is particularly preferable. Additionally, to modify the emission spectrum of a lamp, an additive such as metal halide may be present. A lamp having an emission maximum at a wavelength of 200 nm to 450 nm is particularly suitable.

The energy output of the radiation source is preferably 20 W/cm to 1000 W/cm and more preferably 40 W/cm to 500 W/cm, but if a desired exposure dose can be achieved, the energy output may be higher or lower than the aforementioned exposure dose. By the exposure intensity, curing of the film is adjusted. The exposure dose is measured in a wavelength range of UV-A by using a High Energy UV Radiometer (UV Power Puck™ manufactured by EIT-Instrument Markets), and the exposure dose is preferably 40 mJ/cm$^2$ or greater, more preferably 100 mJ/cm$^2$ to 3,000 mJ/cm$^2$, and most preferably 150 mJ/cm$^2$ to 1,500 mJ/cm$^2$. The exposure time can be freely selected, and is preferably short, and most preferably less than 2 seconds.

Moreover, in a case where the coating speed is high, to obtain the required exposure dose, a plurality of light sources may be used. In this case, the exposure intensities of the plurality of light sources may be the same as or different from each other.

<<Applications of Electrolyte Membrane>>

The electrolyte membrane of the present invention is particularly useful as an ion-exchange membrane, and can be used in electrodeionization, continuous electrodeionization, electrodialysis, reverse electrodialysis, or the like. In addition, the electrolyte membrane of the present invention can be used in not only general applications but also medical applications, and in recent years, can be used in a solid polymer electrolyte type fuel cell.

EXAMPLES

Hereinafter, the present invention will be described in more detail with reference to examples, but the present invention is not limited to the examples. Moreover, "parts" and "%" are based on mass unless specified otherwise.

<Synthesis Example>

[Synthesis of Charged Crosslinker]

(Synthesis of Compound (M-1))

A synthesis scheme of a resin (M-1) is shown below.

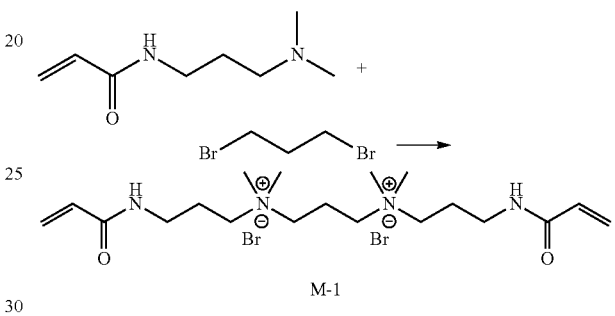

M-1

25.1 g (160 mmol, manufactured by Tokyo Chemical Industry Co., Ltd.) of N-[3-(dimethylamino)propyl]acrylamide was added to a mixed solution of 16.2 g (80.2 mmol, manufactured by Wako Pure Chemical Industries, Ltd.) of 1,3-dibromopropane, 62 mL of acetonitrile, 15 mL of methanol, and 210 mg of 4-hydroxy-2,2,6,6-tetramethylpiperidine 1-oxyl (manufactured by Tokyo Chemical Industry Co., Ltd.), and the resultant product was stirred at 50° C. for 9 hours. After being allowed to react, filtration was performed, then, 450 mL of acetone was added thereto, and decantation of the supernatant was performed two times, whereby 42.2 g of a gum-like compound (M-1) was obtained (moisture content of 10%, yield of 92%).

With the synthesis of the compound (M-1), the following compound (M-1) 1 substitution product was obtained with a yield of 1.0% as a by-product.

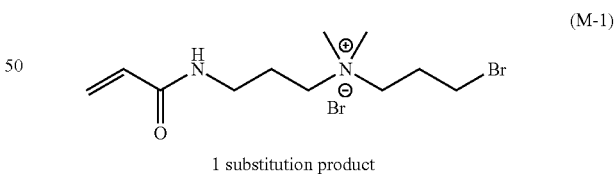

1 substitution product (Synthesis of Compound (M-1α))

The synthesis scheme of a compound (M-1α) is shown below.

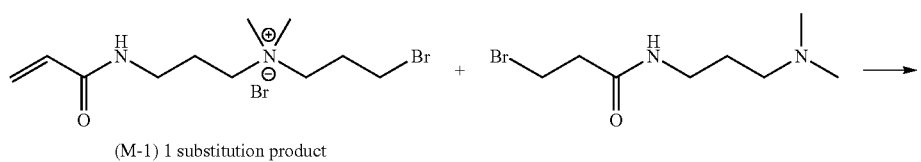

(M-1) 1 substitution product

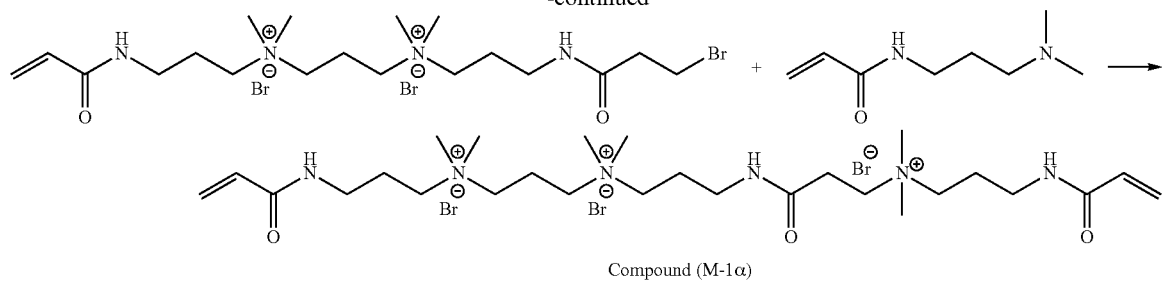

Compound (M-1α)

3.70 g (15.6 mmol) of 3-bromo-N-[3-(dimethylamino) propyl] propanamide was added to a mixed solution of 5.59 g (15.6 mmol) of the compound (M-1) 1 substitution product, 62 mL of acetonitrile, and 15 mL of methanol, and the resultant product was stirred at 50° C. for 8 hours. 2.44 g (15.6 mmol) of N-[3-(dimethylamino)propyl] acrylamide was added to this reaction solution, and the resultant product was stirred at 50° C. for 8 hours. After being allowed to react, filtration was performed, then, 450 mL of acetone was added thereto, and decantation of the supernatant was performed two times, whereby the compound (M-1α) was obtained.

(Synthesis of Compound (M-5))

The synthesis scheme of a compound (M-5) is shown below.

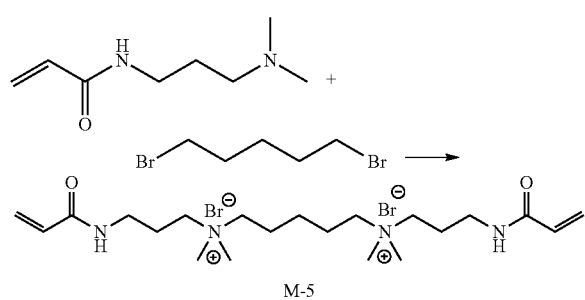

M-5

16.9 g (108 mmol, manufactured by Tokyo Chemical Industry Co., Ltd.) of N-[3-(dimethylamino)propyl]acrylamide was added to a mixed solution of 12.4 g (54.1 mmol, manufactured by Wako Pure Chemical Industries, Ltd.) of 1,5-dibromopentane, 44 mL of acetonitrile, 22 mL of methanol, and 14.7 mg of 4-hydroxy-2,2,6,6-tetramethylpiperidine 1-oxyl (manufactured by Tokyo Chemical Industry Co., Ltd.), and the resultant product was stirred at 50° C. for 9 hours. After being allowed to react, filtration was performed, then, 320 mL of acetone was added thereto, and decantation of the supernatant was performed two times, whereby 29.8 g of the compound (M-5) was obtained (moisture content of 10%, yield of 92%).

With the synthesis of the compound (M-5), the following compound (M-5) 1 substitution product was obtained with a yield of 1.0% as a by-product.

(M-5)

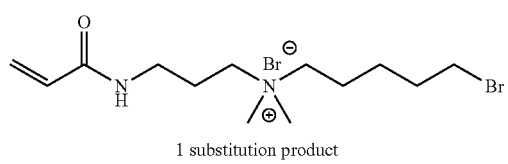

1 substitution product (Synthesis of Compound (M-6))

The synthesis scheme of a compound (M-6) is shown below.

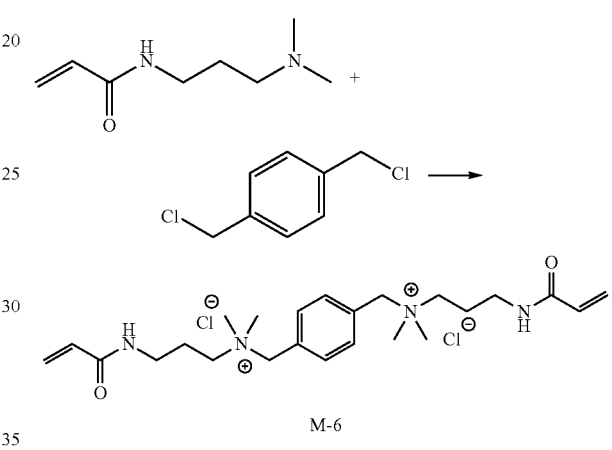

M-6

31.3 g (200 mmol, manufactured by Tokyo Chemical Industry Co., Ltd.) of N-[3-(dimethylamino)propyl]acrylamide was added to a mixed solution of 17.5 g (100 mmol, manufactured by Wako Pure Chemical Industries, Ltd.) of 1,4-bis(chloromethyl)benzene, 156 mL of acetonitrile, 310 mL of methanol, and 24.4 mg of 4-methoxyphenol (manufactured by Tokyo Chemical Industry Co., Ltd.), and the resultant product was stirred at 50° C. for 2 hours. After being allowed to react, filtration was performed, then, 1.54 L of acetone was added thereto, followed by stirring at room temperature for 1 hour, and the produced crystal was filtered, whereby 48.3 g of the compound (M-6) was obtained as a white crystal (moisture content of 7.0%, yield of 92%).

With the synthesis of the compound (M-6), the following compound (M-6) 1 substitution product was obtained with a yield of 0.5% as a by-product.

(M-6)

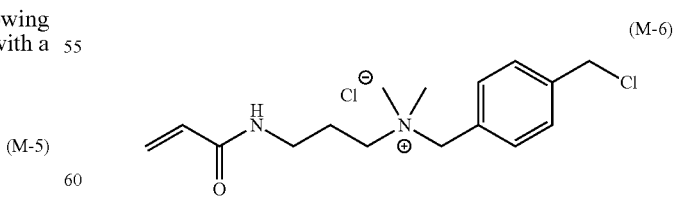

1 substitution product (Synthesis of Compound (M-6α))

The synthesis scheme of a compound (M-6α) is shown below.

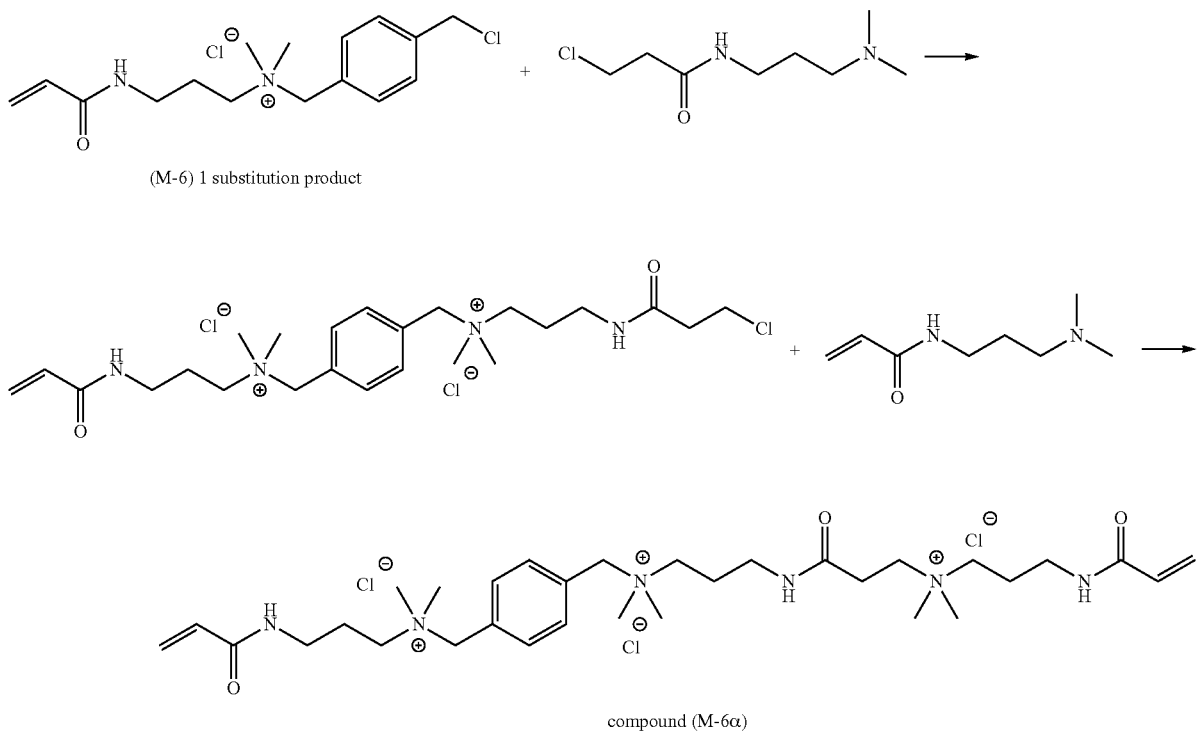

compound (M-6α)

3.01 g (15.6 mmol) of 3-chloro-N-[3-(dimethylamino)propyl] propanamide was added to a mixed solution of 5.17 g (15.6 mmol) of the compound (M-6) 1 substitution product, 62 mL of acetonitrile, and 15 mL of methanol, and the resultant product was stirred at 50° C. for 8 hours. 2.44 g (15.6 mmol) of N-[3-(dimethylamino)propyl] acrylamide was added to this reaction solution, and the resultant product was stirred at 50° C. for 8 hours. After being allowed to react, filtration was performed, then, 450 mL of acetone was added thereto, and decantation of the supernatant was performed two times, whereby the compound (M-1α) was obtained.

(Synthesis of Compound (M-1) Aqueous Solution)

25.1 g (160 mmol, manufactured by Tokyo Chemical Industry Co., Ltd.) of N-[3-(dimethylamino)propyl]acrylamide was added to a mixed solution of 16.2 g (80.2 mmol, manufactured by Wako Pure Chemical Industries, Ltd.) of 1,3-dibromopropane, 11.0 g of ultrapure water, and 210 mg of 4-hydroxy-2,2,6,6-tetramethylpiperazine 1-oxyl (manufactured by Tokyo Chemical Industry Co., Ltd.), followed by stirring at 50° C. for 9 hours, and filtration was performed, whereby 47.9 g of an aqueous solution of the compound (M-1) was obtained (moisture content of 20.0%, yield of 92%).

[Manufacture of Anion-Exchange Membrane]

Example 1

A coating solution of a composition having a compositional ratio (unit: g) shown in the following Table 2 was manually applied to an aluminum plate at a speed of about 5 m/min using a wire bar (a stainless steel bar on which a wire of 150 μm had been wound at 1 lap/3 cm (length direction)), and then, non-woven fabric (manufactured by Freudenberg Group, product name: FO-2223-10, thickness: 100 μm) was impregnated with the coating solution. The excessive coating solution was removed by using a rod on which a wire had not been wound. Temperature of the coating liquid at the time of application was about 50° C. A curing reaction of the support impregnated with the coating solution was performed by using a UV exposure machine (manufactured by Fusion UV Systems, Inc., Model Light Hammer LH6, D-bulb, speed of 15 m/min, 100% strength), whereby an anion-exchange membrane was prepared. The curing time was 0.8 seconds. The exposure time was 0.47 seconds. The obtained membrane was removed from the aluminum plate, and was stored for 12 hours in a 0.1 M NaCl solution. The thickness of the obtained membrane was 134 μm.

Examples 2 to 14

Anion-exchange membranes of Examples 2 to 15 were manufactured in the same manner as in Example 1 except that the composition in the manufacture of the anion-exchange membrane of Example 1 was changed to respective compositions described in the following Table 2.

Moreover, in Examples 14 and 15, aqueous solutions including the compound (M-1) or (M-6α) obtained in the above manner were used.

COMPARATIVE EXAMPLE 1

The following compound (N-1) was synthesized with reference to the description in JP2011-506749A. An anion-exchange membrane of Comparative Example 1 was manufactured in the same manner as in Example 1 except that the composition in the manufacture of the anion-exchange membrane of Example 1 was changed to the composition described in the following Table 2.

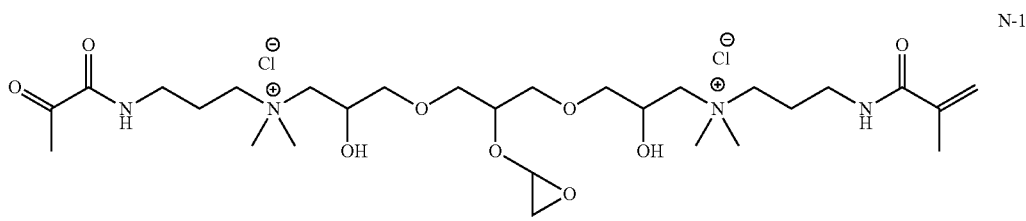 [SMILES: C=C(C)C(=O)NCCC[N+](C)(C)CC(O)COCC(COCC(O)C[N+](C)(C)CCCNC(=O)C(C)=O)OC1CO1 ; [Cl-] ; Cl]

N-1

Comparative Example 2

The following compound (N-2) was synthesized with reference to the description in U.S. Pat. No. 7,087,654B. An anion-exchange membrane of Comparative Example 2 was manufactured in the same manner as in Example 1 except that the composition in the manufacture of the anion-exchange membrane of Example 1 was changed to the composition described in the following Table 2.

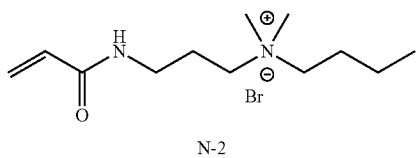

N-2

-continued

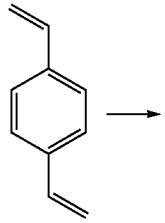

N-3

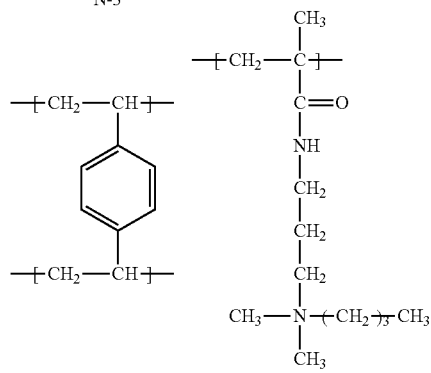

Comparative Example 3

The following compound (N-4) was synthesized with reference to the description in U.S. Pat. No. 7,087,654B. An anion-exchange membrane of Comparative Example 3 was manufactured in the same manner as in Example 1 except that the composition in the manufacture of the anion-exchange membrane of Example 1 was changed to the composition described in the following Table 2.

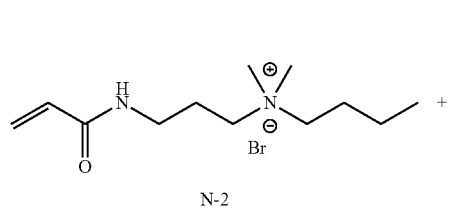 +

N-2

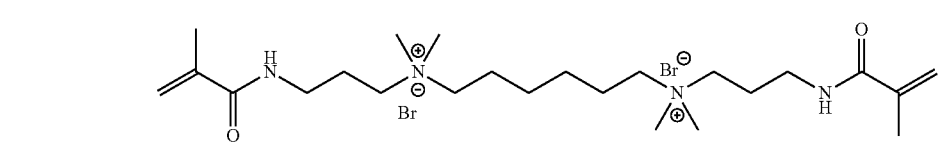

N-4

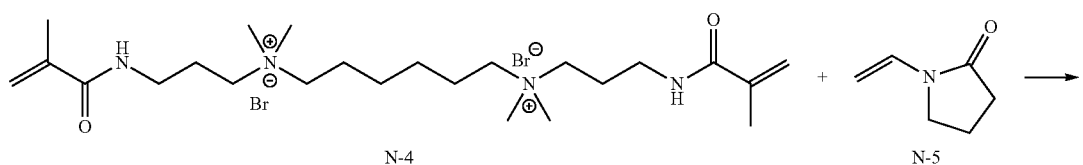

-continued

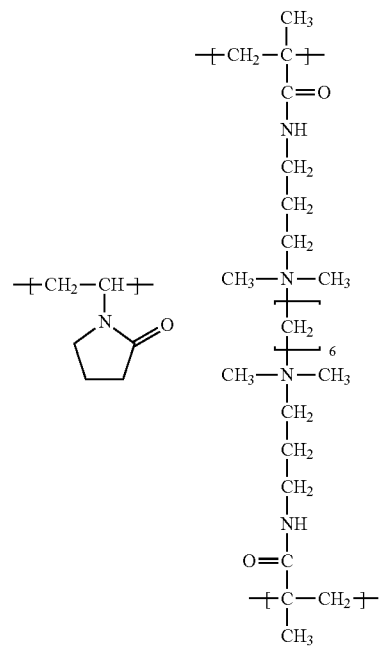

Comparative Examples 4 to 7

Anion-exchange membranes of Comparative Examples 4 to 7 were manufactured in the same manner as in Example 1 except that the composition in the manufacture of the anion-exchange membrane of Example 1 was changed to respective compositions described in the following Table 2.

The values of a1 to c1 or a2 to d2 of the ion-exchange polymers in Examples 1 to 15 and Comparative Examples 1 to 7 are shown in the following Table 1. Moreover, "-" in Tables 1 and 2 indicates a blank.

TABLE 1

|  | General Formula (1) | | | General Formula (2) | | | |
| --- | --- | --- | --- | --- | --- | --- | --- |
|  | a1 | b1 | c1 | a2 | b2 | c2 | d2 |
| Example 1 | 0.350 | 0.640 | 0.010 | — | — | — | — |
| Example 2 | 0.000 | 0.990 | 0.010 | — | — | — | — |
| Example 3 | 0.730 | 0.260 | 0.010 | — | — | — | — |
| Example 4 | 0.500 | 0.490 | 0.010 | — | — | — | — |
| Example 5 | 0.050 | 0.940 | 0.010 | — | — | — | — |
| Example 6 | 0.350 | 0.645 | 0.005 | — | — | — | — |
| Example 7 | 0.350 | 0.635 | 0.015 | — | — | — | — |
| Example 8 | 0.350 | 0.620 | 0.030 | — | — | — | — |

TABLE 1-continued

|  | General Formula (1) | | | General Formula (2) | | | |
| --- | --- | --- | --- | --- | --- | --- | --- |
|  | a1 | b1 | c1 | a2 | b2 | c2 | d2 |
| Example 9 | 0.350 | 0.560 | 0.090 | — | — | — | — |
| Example 10 | — | — | — | 0.350 | 0.630 | 0.010 | 0.010 |
| Example 11 | — | — | — | 0.350 | 0.630 | 0.010 | 0.010 |
| Example 12 | 0.350 | 0.640 | 0.010 | — | — | — | — |
| Example 13 | 0.350 | 0.640 | 0.010 | — | — | — | — |
| Example 14 | — | — | — | 0.350 | 0.630 | 0.010 | 0.010 |
| Example 15 | — | — | — | 0.350 | 0.630 | 0.010 | 0.010 |
| Comparative Example 1 | — | — | — | — | — | — | — |
| Comparative Example 2 | — | — | — | — | — | — | — |
| Comparative Example 3 | — | — | — | — | — | — | — |
| Comparative Example 4 | 0.800 | 0.200 | 0.000 | — | — | — | — |
| Comparative Example 5 | 0.800 | 0.190 | 0.010 | — | — | — | — |
| Comparative Example 6 | 0.350 | 0.650 | 0.000 | — | — | — | — |
| Comparative Example 7 | 0.350 | 0.500 | 0.150 | — | — | — | — |

TABLE 2

|  | Charge density [mmol/g] | Crosslinkable ethylene density [mmol/g] | Example 1 | Example 2 | Example 3 | Example 4 |
| --- | --- | --- | --- | --- | --- | --- |
| DMAPAA-Q | 4.84 | 0.00 | 13.11 | — | 38.43 | 21.13 |
| DMAPAA | 0.00 | 0.00 | — | — | — | — |
| M-1 | 3.89 | 1.94 | 59.64 | 72.89 | 34.06 | 51.53 |
| (M-1) 1 substitution product | 2.79 | 0.00 | 0.65 | 0.510 | 0.912 | 0.740 |
| (M-1α) | 3.99 | 1.33 | — | — | — | — |
| M-5 | 3.69 | 1.84 | — | — | — | — |
| (M-5) 1 substitution product | 2.59 | 0.00 | — | — | — | — |
| M-6 | 4.10 | 2.05 | — | — | — | — |
| (M-6) 1 substitution product | 3.02 | 0.00 | — | — | — | — |
| (M-6α) | 4.41 | 1.47 | — | — | — | — |
| N-1 | 3.03 | 1.52 | — | — | — | — |
| N-2 | 3.41 | 0.00 | — | — | — | — |
| N-3 | 0.00 | 7.68 | — | — | — | — |

TABLE 2-continued

|  | | | | | | |
|---|---|---|---|---|---|---|
| N-4 | 3.42 | 1.71 | — | — | — | — |
| N-5 | 0.00 | 0.00 | — | — | — | — |
| MEHQ |  |  | 0.08 | 0.08 | 0.08 | 0.08 |
| Darocur 1173 |  |  | 0.42 | 0.42 | 0.42 | 0.42 |
| Tego Glide 432 |  |  | 0.84 | 0.84 | 0.84 | 0.84 |
| Pure water |  |  | 20.2 | 20.20 | 20.20 | 20.20 |
| IPA |  |  | 5.05 | 5.05 | 5.05 | 5.05 |
| Total |  |  | 100.00 | 100.00 | 100.00 | 100.00 |

|  | Example 5 | Example 6 | Example 7 | Example 8 | Example 9 | Example 10 | Example 11 |
|---|---|---|---|---|---|---|---|
| DMAPAA-Q | 1.53 | 13.08 | 13.13 | 13.21 | 13.53 | 13.03 | 13.23 |
| DMAPAA | — | — | — | — | — | — | 0.29 |
| M-1 | 71.35 | 60 | 59.29 | 58.23 | 53.85 | 58.37 | 59.23 |
| (M-1) 1 substitution product | 0.52 | 0.32 | 0.98 | 1.96 | 6.03 | 0.65 | 0.65 |
| (M-1α) | — | — | — | — | — | 1.35 | — |
| M-5 | — | — | — | — | — | — | — |
| (M-5) 1 substitution product | — | — | — | — | — | — | — |
| M-6 | — | — | — | — | — | — | — |
| (M-6) 1 substitution product | — | — | — | — | — | — | — |
| (M-6α) | — | — | — | — | — | — | — |
| N-1 | — | — | — | — | — | — | — |
| N-2 | — | — | — | — | — | — | — |
| N-3 | — | — | — | — | — | — | — |
| N-4 | — | — | — | — | — | — | — |
| N-5 | — | — | — | — | — | — | — |
| MEHQ | 0.08 | 0.08 | 0.08 | 0.08 | 0.08 | 0.08 | 0.08 |
| Darocur 1173 | 0.42 | 0.42 | 0.42 | 0.42 | 0.42 | 0.42 | 0.42 |
| Tego Glide 432 | 0.84 | 0.84 | 0.84 | 0.84 | 0.84 | 0.84 | 0.84 |
| Pure water | 20.20 | 20.20 | 20.20 | 20.20 | 20.20 | 20.20 | 20.20 |
| IPA | 5.05 | 5.05 | 5.05 | 5.05 | 5.05 | 5.05 | 5.05 |
| Total | 100.00 | 100.00 | 100.00 | 100.00 | 100.01 | 100.00 | 100.00 |

TABLE 3

Continued from Table 2

|  | Charge density [mmol/g] | Crosslinkable ethylene density [mmol/g] | Example 12 | Example 13 | Example 14 (directly using M-1 aqueous solution) | Example 15 (directly using M-6 aqueous solution) | Comparative Example 1 |
|---|---|---|---|---|---|---|---|
| DMAPAA-Q | 4.84 | 0.00 | 13.70 | 12.54 | 13.03 | 13.63 | — |
| DMAPAA | 0.00 | 0.00 | — | — | — | — | — |
| M-1 | 3.89 | 1.94 | — | — | 58.37 | — | — |
| (M-1) 1 substitution product | 2.79 | 0.00 | — | 0.65 | — | — | — |
| (M-1α) | 3.99 | 1.33 | — | — | 1.35 | — | — |
| M-5 | 3.69 | 1.84 | — | 60.19 | — | — | — |
| (M-5) 1 substitution product | 2.59 | 0.00 | — | 0.67 | — | — | — |
| M-6 | 4.10 | 2.05 | 59.07 | — | — | 57.86 | — |
| (M-6) 1 substitution product | 3.02 | 0.00 | 0.63 | — | — | 0.62 | — |
| (M-6α) | 4.41 | 1.47 | — | — | — | 1.28 | — |
| N-1 | 3.03 | 1.52 | — | — | — | — | 73.40 |
| N-2 | 3.41 | 0.00 | — | — | — | — | — |
| N-3 | 0.00 | 7.68 | — | — | — | — | — |
| N-4 | 3.42 | 1.71 | — | — | — | — | — |
| N-5 | 0.00 | 0.00 | — | — | — | — | — |
| MEHQ |  |  | 0.08 | 0.08 | 0.08 | 0.08 | 0.08 |
| Darocur 1173 |  |  | 0.42 | 0.42 | 0.42 | 0.42 | 0.42 |
| Tego Glide 432 |  |  | 0.84 | 0.84 | 0.84 | 0.84 | 0.84 |
| Pure water |  |  | 20.20 | 20.20 | 20.20 | 20.20 | 20.20 |
| IPA |  |  | 5.05 | 5.05 | 5.05 | 5.05 | 5.05 |
| Total |  |  | 100.00 | 100.00 | 100.00 | 100.00 | 100.00 |

TABLE 3-continued

| | Comparative Example 2 | Comparative Example 3 | Comparative Example 4 | Comparative Example 5 | Comparative Example 6 | Comparative Example 7 |
|---|---|---|---|---|---|---|
| | Continued from Table 2 | | | | | |
| DMAPAA-Q | — | — | 46.21 | 45.52 | 13.06 | 13.86 |
| DMAPAA | — | — | — | — | — | — |
| M-1 | — | — | 27.19 | 26.90 | 60.34 | 49.25 |
| (M-1) 1 substitution product | — | — | — | 0.98 | — | 10.29 |
| (M-1α) | — | — | — | — | — | — |
| M-5 | — | — | — | — | — | — |
| (M-5) 1 substitution product | — | — | — | — | — | — |
| M-6 | — | — | — | — | — | — |
| (M-6) 1 substitution product | — | — | — | — | — | — |
| (M-6α) | — | — | — | — | — | — |
| N-1 | — | — | — | — | — | — |
| N-2 | 56.20 | — | — | — | — | — |
| N-3 | 17.20 | — | — | — | — | — |
| N-4 | — | 57.20 | — | — | — | — |
| N-5 | — | 16.20 | — | — | — | — |
| MEHQ | 0.08 | 0.08 | 0.08 | 0.08 | 0.08 | 0.08 |
| Darocur 1173 | 0.42 | 0.42 | 0.42 | 0.42 | 0.42 | 0.42 |
| Tego Glide 432 | 0.84 | 0.84 | 0.84 | 0.84 | 0.84 | 0.84 |
| Pure water | 20.20 | 20.20 | 20.20 | 20.20 | 20.20 | 20.20 |
| IPA | 5.05 | 5.05 | 5.05 | 5.05 | 5.05 | 5.05 |
| Total | 100.00 | 100.00 | 100.00 | 100.00 | 100.00 | 100.00 |

[Description of Abbreviation in Table 2]

DMAPAA-Q: a dimethylaminopropyl acrylamide methyl chloride quaternary salt (manufactured by Tokyo Chemical Industry Co., Ltd.)

DMAPAA: dimethylaminopropyl acrylamide (manufactured by KOHJIN Film and Chemicals Co., Ltd.)

MEHQ: monomethyl ether hydroquinone

Darocur 1173: product name, manufactured by Ciba Specialty Chemicals Inc.

Tego Glide 432: product name, manufactured by EVONIK INDUSTRIES

IPA: isopropanol

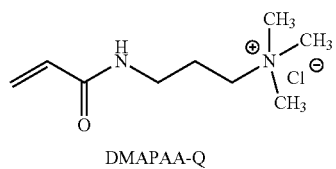

DMAPAA-Q

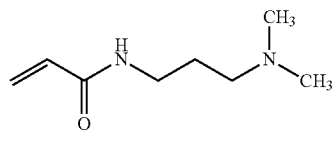

DMAPAA

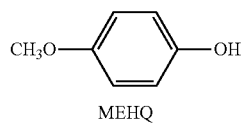

MEHQ

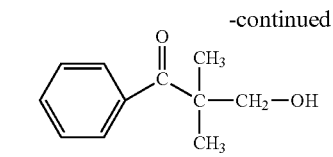

Darocur 1173

The charge density and the crosslinkable ethylene group density were determined by calculating by the following expression (1) or (2), and are shown in Table 3.

<Charge Density>

$$N/M \times 1{,}000 \text{ [mmol/g]} \quad \text{Expression (1)}$$

Here, N represents the number of ammonium groups included in the unit structure, and M represents the molecular weight of the unit structure.

<Crosslinkable Ethylene Group Density>

$$(E-1)/M \times 1{,}000 \text{ [mmol/g]} \quad \text{Expression (2)}$$

E represents the number of polymerizable ethylene groups included in the unit structure, and M represents the molecular weight of the unit structure.

Moreover, the crosslinkable ethylene density is shown in Table 3.

Evaluation of the following items was performed on the anion-exchange membranes manufactured in Examples 1 to 15 and Comparative Examples 1 to 7.

The obtained results are collectively shown in Table 3 below.

[Permselectivity]

The membrane potential (V) was measured by a static membrane potential measurement, and from this, the permselectivity was calculated. Two electrolytic cells were separated by a membrane which was a measuring object. Before measurement, a membrane was equilibrated in a 0.05 M NaCl aqueous solution for about 16 hours. Thereafter, NaCl aqueous solutions having different concentrations were poured into electrolytic cells on both sides facing a membrane which was a measuring object, respectively.

100 mL of a 0.05 M NaCl aqueous solution was poured into one cell. In addition, 100 mL of 0.5 M NaCl aqueous solution was poured into the other cell.

After the temperature of the NaCl aqueous solution in the cell was stabilized at 25° C. in a constant temperature water tank, both electrolytic cells and a Ag/AgCl reference electrode (manufactured by Metrohm AG in Swiss) were connected through a salt bridge, then, the membrane potential (V) was measured while passing both solutions toward the membrane surfaces, and the permselectivity t was calculated by the following Equation (a).

Moreover, the effective area of the membrane was 1 cm².

$$t=(a+b)/2b \quad \text{Equation (a)}$$

The details of respective reference signs in Equation (a) are shown below.
a: membrane potential (V)
b: $0.5915 \log(f_1c_1/f_2c_2)$ (V)
$f_1$, $f_2$: activity coefficient of NaCl in both cells
$c_1$, $c_2$: concentration (M) of NaCl in both cells

[Water Permeability (ml/m²/Pa/hr)]

The water permeability of the membrane was measured by using a device having a flow path 10 shown in FIG. 1. In FIG. 1, a reference sign 1 represents a membrane, and reference signs 3 and 4 represent a flow path of a feed solution (pure water) and a flow path of a draw solution (3 M NaCl), respectively. In addition, arrows of a reference sign 2 represent flow of water separated from the feed solution.

400 mL of the feed solution and 400 mL of the draw solution are brought into contact through the membrane (membrane contact area of 18 cm²), and each solution was passed at a flow rate of 8 cm/sec in the direction of the arrow of a reference sign 5 using a peristaltic pump. The speed at which water in the feed solution permeates into the draw solution through the membrane was analyzed by measuring the mass of the feed solution and the draw solution in real time, and the water permeability was determined.

[Electric Resistance (Ω/cm²) of Membrane]

Both surfaces of the membrane immersed in a 0.5 M NaCl aqueous solution for about 2 hours were wiped with a dry filter paper, and the membrane was put into two-chamber type cell (effective membrane area of 1 cm², a platinum electrode was used as the electrode). Both chambers were filled with 20 mL of a 0.5M NaCl and allowed to stand to until reaching equilibrium in a constant temperature water tank at 25° C., and after the liquid temperature in the cell became precisely 25° C., the electric resistance $r_1$ was measured by using an AC bridge (frequency of 1,000 Hz).

Next, the membrane was removed, then, the electric resistance $r_2$ between two electrodes as only the 0.5 M NaCl aqueous solution was measured, and the electric resistance R (Ω/cm²) of the membrane was determined from $r_1-r_2$.

The obtained values are shown in the following Table 3, as a membrane resistance.

[Temporal Stability]

As temporal stability, a test of durability with respect to chlorine, a test of durability at pH2 (test of durability with respect to acids), and a test of durability at pH12 (test of durability with respect to alkalis) were performed in the following manner.

(1) Test of Durability with Respect to Chlorine

A sodium hypochlorite solution (product name: TLE2246, Shonan Wako Pure Chemical Co., Ltd.) was diluted with pure water. The chlorine concentration was measured by using AQ-102 (trade name) manufactured by SIBATA SCIENTIFIC TECHNOLOGY LTD. (iodine reagent absorptiometry), and adjusted so as to be about 135 mgCl₂/L.

After the anion-exchange membranes manufactured in Examples 1 to 15 and Comparative Examples 1 to 7 were immersed in the sodium hypochlorite solution with the concentration adjusted as described for 24 hours, the anion-exchange membranes were taken out, and the permselectivity, the water permeability, and the electric resistance of the membrane were measured in the same manner as described above.

In the following Table 3, the permselectivity, the water permeability, and the electric resistance of the membrane after immersion for 24 hours are shown, and reduction ratios of these are also shown. Reduction ratio (%) was determined from the absolute value of [(value before immersion in sodium hypochlorite solution)−(value after immersion)]/ (value before immersion in sodium hypochlorite solution)× 100.

(2) Test of Durability with Respect to Acid at pH 2

By diluting a mixture of 1 M hydrochloric acid (manufactured by Wako Pure Chemical Industries, Ltd.) and citric acid and trisodium citrate dihydrate (all manufactured by Wako Pure Chemical Industries, Ltd.) as a buffering agent with pure water, a hydrochloric acid aqueous solution having a pH 2 was prepared.

After the anion-exchange membranes manufactured in Examples 1 to 15 and Comparative Examples 1 to 7 were immersed in the sodium hydroxide aqueous solution with the concentration adjusted as described for 24 hours, the anion-exchange membranes were taken out, and the permselectivity, the water permeability, and the electric resistance of the membrane were measured in the same manner as described above.

In the following Table 3, the permselectivity, the water permeability, and the electric resistance of the membrane after immersion for 24 hours are shown, and reduction ratios of these are also shown.

The reduction ratio (%) was determined from the absolute value of [(value before immersion in solution having pH 2)−(value after immersion)]/(value before immersion in solution having pH 2)×100.

(3) Test of Durability with Respect to Acid at pH 12

By diluting a mixture of sodium hydroxide granules (manufactured by Wako Pure Chemical Industries, Ltd.) and sodium dihydrogenphosphate dihydrate (manufactured by Wako Pure Chemical Industries, Ltd.) as a buffering agent with pure water, a sodium hydroxide aqueous solution having a pH 12 was prepared.

The reduction ratio (%) was determined from the absolute value of [(value before immersion in solution having pH 12)−(value after immersion)]/(value before immersion in solution having pH 12)×100.

In the following Table 3, these results, the value after the durability test, and the ratio of change before and after the durability test are shown.

TABLE 4

| Items | Details | Example 1 | Example 2 | Example 3 | Example 4 | Example 5 | Example 6 |
|---|---|---|---|---|---|---|---|
| Polymer concentration-characteristics | Polymer concentration [wt %] | 74.75 | 74.75 | 74.75 | 74.75 | 74.75 | 74.75 |
| | Charge density [mmol/g] | 3.98 | 3.81 | 4.29 | 4.08 | 3.83 | 3.98 |
| | Crosslinkable ethylene density [mmol/g] | 1.55 | 1.90 | 0.89 | 1.34 | 1.86 | 1.56 |
| Electrolyte membrane characteristics | Permselectivity | 0.97 | 0.99 | 0.96 | 0.97 | 0.99 | 0.97 |
| | Water permeability (ml/m$^2$/Pa/hr) | $7.40 \times 10^{-5}$ | $6.30 \times 10^{-5}$ | $7.50 \times 10^{-5}$ | $7.50 \times 10^{-5}$ | $6.40 \times 10^{-5}$ | $7.30 \times 10^{-5}$ |
| | Membrane resistance ($\Omega$/cm$^2$) | 1.50 | 1.60 | 1.30 | 1.40 | 1.61 | 1.53 |
| Temporal stability (after test of durability with respect to chlorine) | Permselectivity | 0.93 | 0.98 | 0.96 | 0.95 | 0.98 | 0.86 |
| | Water permeability (ml/m$^2$/Pa/hr) | $7.70 \times 10^{-5}$ | $6.50 \times 10^{-5}$ | $7.70 \times 10^{-5}$ | $7.80 \times 10^{-5}$ | $6.70 \times 10^{-5}$ | $8.20 \times 10^{-5}$ |
| | Membrane resistance ($\Omega$/cm$^2$) | 1.52 | 1.63 | 1.33 | 1.45 | 1.64 | 1.70 |
| Reduction ratio (after test of durability with respect to chlorine) | Permselectivity | 4.1% | 1.0% | 0.0% | 2.1% | 1.0% | 11.3% |
| | Water permeability | 4.1% | 3.2% | 2.7% | 4.0% | 4.7% | 12.3% |
| | Membrane resistance ($\Omega$/cm$^2$) | 1.3% | 1.9% | 2.3% | 3.6% | 1.9% | 11.1% |
| Temporal stability (after test of durability at pH = 2) | Permselectivity | 0.92 | 0.97 | 0.95 | 0.95 | 0.96 | 0.85 |
| | Water permeability (ml/m$^2$/Pa/hr) | $7.60 \times 10^{-5}$ | $6.50 \times 10^{-5}$ | $7.70 \times 10^{-5}$ | $7.80 \times 10^{-5}$ | $6.50 \times 10^{-5}$ | $8.10 \times 10^{-5}$ |
| | Membrane resistance ($\Omega$/cm$^2$) | 1.54 | 1.64 | 1.35 | 1.43 | 1.62 | 1.69 |
| Reduction ratio (after test of durability at pH = 2) | Permselectivity | 5.2% | 2.0% | 1.0% | 2.1% | 3.0% | 12.4% |
| | Water permeability | 2.7% | 3.2% | 2.7% | 4.0% | 1.6% | 11.0% |
| | Membrane resistance ($\Omega$/cm$^2$) | 2.7% | 2.5% | 3.9% | 2.1% | 0.6% | 10.5% |
| Temporal stability (after test of durability at pH = 12) | Permselectivity | 0.91 | 0.96 | 0.94 | 0.94 | 0.95 | 0.84 |
| | Water permeability (ml/m$^2$/Pa/hr) | $7.70 \times 10^{-5}$ | $6.60 \times 10^{-5}$ | $7.75 \times 10^{-5}$ | $7.78 \times 10^{-5}$ | $6.60 \times 10^{-5}$ | $8.20 \times 10^{-5}$ |
| | Membrane resistance ($\Omega$/cm$^2$) | 1.55 | 1.65 | 1.36 | 1.44 | 1.63 | 1.70 |
| Reduction ratio (after test of durability at pH = 12) | Permselectivity | 6.2% | 3.0% | 2.1% | 3.1% | 4.0% | 13.4% |
| | Water permeability | 4.1% | 4.8% | 3.3% | 3.7% | 3.1% | 12.3% |
| | Membrane resistance ($\Omega$/cm$^2$) | 3.3% | 3.1% | 4.6% | 2.9% | 1.2% | 11.1% |

| Items | Details | Example 7 | Example 8 | Example 9 | Example 10 | Example 11 |
|---|---|---|---|---|---|---|
| Polymer concentration-characteristics | Polymer concentration [wt %] | 74.75 | 74.75 | 74.76 | 74.75 | 74.75 |
| | Charge density [mmol/g] | 3.97 | 3.96 | 3.90 | 3.98 | 3.96 |
| | Crosslinkable ethylene density [mmol/g] | 1.54 | 1.51 | 1.40 | 1.54 | 1.54 |
| Electrolyte membrane characteristics | Permselectivity | 0.96 | 0.97 | 0.98 | 0.96 | 0.97 |
| | Water permeability (ml/m$^2$/Pa/hr) | $7.40 \times 10^{-5}$ | $7.40 \times 10^{-5}$ | $7.40 \times 10^{-5}$ | $7.20 \times 10^{-5}$ | $7.35 \times 10^{-5}$ |
| | Membrane resistance ($\Omega$/cm$^2$) | 1.53 | 1.54 | 1.59 | 1.52 | 1.57 |
| Temporal stability (after test of durability with respect to chlorine) | Permselectivity | 0.96 | 0.97 | 0.88 | 0.93 | 0.92 |
| | Water permeability (ml/m$^2$/Pa/hr) | $7.50 \times 10^{-5}$ | $7.50 \times 10^{-5}$ | $8.20 \times 10^{-5}$ | $7.40 \times 10^{-5}$ | $7.60 \times 10^{-5}$ |
| | Membrane resistance ($\Omega$/cm$^2$) | 1.55 | 1.56 | 1.75 | 1.56 | 1.60 |
| Reduction ratio (after test of durability with respect to chlorine) | Permselectivity | 0.0% | 0.0% | 10.0% | 3.1% | 5.2% |
| | Water permeability | 1.4% | 1.4% | 10.8% | 2.8% | 3.4% |
| | Membrane resistance ($\Omega$/cm$^2$) | 1.3% | 1.3% | 10.1% | 2.6% | 1.9% |
| Temporal stability (after test of durability at pH = 2) | Permselectivity | 0.90 | 0.95 | 0.95 | 0.93 | 0.92 |
| | Water permeability (ml/m$^2$/Pa/hr) | $7.90 \times 10^{-5}$ | $7.60 \times 10^{-5}$ | $7.50 \times 10^{-5}$ | $7.50 \times 10^{-5}$ | $7.60 \times 10^{-5}$ |
| | Membrane resistance ($\Omega$/cm$^2$) | 1.61 | 1.54 | 1.62 | 1.58 | 1.61 |
| Reduction ratio (after test of durability at pH = 2) | Permselectivity | 6.3% | 2.1% | 3.1% | 3.1% | 5.2% |
| | Water permeability | 6.8% | 2.7% | 1.4% | 4.2% | 3.4% |
| | Membrane resistance ($\Omega$/cm$^2$) | 5.2% | 0.0% | 1.9% | 4.0% | 2.6% |
| Temporal stability (after test of durability at pH = 12) | Permselectivity | 0.89 | 0.94 | 0.94 | 0.92 | 0.91 |
| | Water permeability (ml/m$^2$/Pa/hr) | $8.00 \times 10^{-5}$ | $7.70 \times 10^{-5}$ | $7.70 \times 10^{-5}$ | $7.60 \times 10^{-5}$ | $7.70 \times 10^{-5}$ |
| | Membrane resistance ($\Omega$/cm$^2$) | 1.62 | 1.55 | 1.64 | 1.60 | 1.63 |
| Reduction ratio (after test of durability at pH = 12) | Permselectivity | 7.3% | 3.1% | 4.1% | 4.2% | 6.2% |
| | Water permeability | 8.1% | 4.1% | 4.1% | 5.6% | 4.8% |
| | Membrane resistance ($\Omega$/cm$^2$) | 5.9% | 0.7% | 3.1% | 5.3% | 3.8% |

TABLE 5

Continued from Table 3

| Items | Details | Example 12 | Example 13 | Example 14 (directly using M-1 aqueous solution) | Example 15 (directly using M-6 aqueous solution) | Comparative Example 1 | Comparative Example 2 |
|---|---|---|---|---|---|---|---|
| Polymer concentration-characteristics | Polymer concentration [wt %] | 74.75 | 74.75 | 74.75 | 74.75 | 74.75 | 74.75 |
| | Charge density [mmol/g] | 4.15 | 3.80 | 3.98 | 4.23 | 2.98 | 2.56 |
| | Crosslinkable ethylene density [mmol/g] | 1.62 | 1.48 | 1.54 | 1.64 | 1.49 | 1.77 |
| Electrolyte membrane characteristics | Permselectivity | 0.96 | 0.99 | 0.99 | 0.96 | 0.88 | 0.87 |
| | Water permeability (ml/m$^2$/Pa/hr) | $7.40 \times 10^{-5}$ | $7.50 \times 10^{-5}$ | $6.30 \times 10^{-5}$ | $7.39 \times 10^{-5}$ | $1.51 \times 10^{-4}$ | $1.49 \times 10^{-4}$ |
| | Membrane resistance ($\Omega$/cm$^2$) | 1.35 | 1.60 | 1.60 | 1.36 | 3.67 | 3.71 |

TABLE 5-continued

Continued from Table 3

| | | | | | | | |
|---|---|---|---|---|---|---|---|
| Temporal stability (after test of durability with respect to chlorine) | Permselectivity | 0.96 | 0.95 | 0.98 | 0.96 | 0.68 | 0.69 |
| | Water permeability (ml/m$^2$/Pa/hr) | $7.41 \times 10^{-5}$ | $7.70 \times 10^{-5}$ | $6.60 \times 10^{-5}$ | $7.40 \times 10^{-5}$ | $2.41 \times 10^{-4}$ | $2.62 \times 10^{-4}$ |
| | Membrane resistance ($\Omega$/cm$^2$) | 1.36 | 1.64 | 1.63 | 1.37 | 4.59 | 4.74 |
| Reduction ratio (after test of durability with respect to chlorine) | Permselectivity | 0.0% | 4.0% | 1.0% | 0.0% | 22.7% | 20.7% |
| | Water permeability (ml/m$^2$/Pa/hr) | 0.1% | 2.7% | 4.8% | 0.1% | 59.6% | 75.8% |
| | Membrane resistance ($\Omega$/cm$^2$) | 0.7% | 2.5% | 1.9% | 0.7% | 25.1% | 27.8% |
| Temporal stability (after test of durability at pH = 2) | Permselectivity | 0.96 | 0.94 | 0.97 | 0.96 | 0.66 | 0.67 |
| | Water permeability (ml/m$^2$/Pa/hr) | $7.42 \times 10^{-5}$ | $7.80 \times 10^{-5}$ | $6.50 \times 10^{-5}$ | $7.43 \times 10^{-5}$ | $2.50 \times 10^{-4}$ | $2.69 \times 10^{-4}$ |
| | Membrane resistance ($\Omega$/cm$^2$) | 1.37 | 1.65 | 1.63 | 1.38 | 4.65 | 4.80 |
| Reduction ratio (after test of durability at pH = 2) | Permselectivity | 0.0% | 5.1% | 2.0% | 0.0% | 25.0% | 23.0% |
| | Water permeability (ml/m$^2$/Pa/hr) | 0.3% | 4.0% | 3.2% | 0.5% | 65.6% | 80.5% |
| | Membrane resistance ($\Omega$/cm$^2$) | 1.5% | 3.1% | 1.9% | 1.5% | 26.7% | 29.4% |
| Temporal stability (after test of durability at pH = 12) | Permselectivity | 0.95 | 0.93 | 0.96 | 0.95 | 0.62 | 0.65 |
| | Water permeability (ml/m$^2$/Pa/hr) | $7.45 \times 10^{-5}$ | $7.85 \times 10^{-5}$ | $6.70 \times 10^{-5}$ | $7.47 \times 10^{-5}$ | $2.60 \times 10^{-4}$ | $2.70 \times 10^{-4}$ |
| | Membrane resistance ($\Omega$/cm$^2$) | 1.38 | 1.66 | 1.65 | 1.39 | 4.70 | 4.90 |
| Reduction ratio (after test of durability at pH = 12) | Permselectivity | 1.0% | 6.1% | 3.0% | 1.0% | 29.6% | 25.3% |
| | Water permeability (ml/m$^2$/Pa/hr) | 0.7% | 4.7% | 6.4% | 1.1% | 72.2% | 81.2% |
| | Membrane resistance ($\Omega$/cm$^2$) | 2.2% | 3.8% | 3.1% | 2.2% | 28.1% | 32.1% |

| Items | Details | Comparative Example 3 | Comparative Example 4 | Comparative Example 5 | Comparative Example 6 | Comparative Example 7 |
|---|---|---|---|---|---|---|
| Polymer concentration-characteristics | Polymer concentration [wt %] | 74.75 | 74.75 | 74.75 | 74.75 | 74.75 |
| | Charge density [mmol/g] | 2.62 | 4.41 | 4.38 | 3.99 | 3.84 |
| | Crosslinkable ethylene density [mmol/g] | 1.31 | 0.71 | 0.70 | 1.57 | 1.28 |
| Electrolyte membrane characteristics | Permselectivity | 0.89 | 0.91 | 0.92 | 0.95 | 0.95 |
| | Water permeability (ml/m$^2$/Pa/hr) | $1.56 \times 10^{-4}$ | $1.60 \times 10^{-4}$ | $1.59 \times 10^{-4}$ | $6.40 \times 10^{-5}$ | $1.05 \times 10^{-4}$ |
| | Membrane resistance ($\Omega$/cm$^2$) | 3.88 | 1.27 | 1.28 | 1.49 | 1.58 |
| Temporal stability (after test of durability with respect to chlorine) | Permselectivity | 0.72 | 0.72 | 0.89 | 0.76 | 0.94 |
| | Water permeability (ml/m$^2$/Pa/hr) | $2.73 \times 10^{-4}$ | $2.59 \times 10^{-4}$ | $1.70 \times 10^{-4}$ | $1.01 \times 10^{-4}$ | $1.07 \times 10^{-4}$ |
| | Membrane resistance ($\Omega$/cm$^2$) | 4.89 | 1.80 | 1.40 | 2.42 | 1.61 |
| Reduction ratio (after test of durability with respect to chlorine) | Permselectivity | 19.1% | 20.9% | 3.3% | 20.0% | 1.1% |
| | Water permeability (ml/m$^2$/Pa/hr) | 75.0% | 61.9% | 6.9% | 57.8% | 1.9% |
| | Membrane resistance ($\Omega$/cm$^2$) | 26.0% | 41.7% | 9.4% | 62.4% | 1.9% |
| Temporal stability (after test of durability at pH = 2) | Permselectivity | 0.69 | 0.68 | 0.88 | 0.75 | 0.93 |
| | Water permeability (ml/m$^2$/Pa/hr) | $2.78 \times 10^{-4}$ | $2.63 \times 10^{-4}$ | $1.72 \times 10^{-4}$ | $1.21 \times 10^{-4}$ | $1.07 \times 10^{-4}$ |
| | Membrane resistance ($\Omega$/cm$^2$) | 4.95 | 1.85 | 1.42 | 2.50 | 1.61 |
| Reduction ratio (after test of durability at pH = 2) | Permselectivity | 22.5% | 25.3% | 4.4% | 21.1% | 2.1% |
| | Water permeability | 78.2% | 64.4% | 8.2% | 89.1% | 1.9% |
| | Membrane resistance | 27.6% | 45.7% | 10.9% | 67.8% | 1.9% |
| Temporal stability (after test of durability at pH = 12) | Permselectivity | 0.68 | 0.67 | 0.87 | 0.73 | 0.93 |
| | Water permeability | $2.90 \times 10^{-4}$ | $2.65 \times 10^{-4}$ | $1.74 \times 10^{-4}$ | $1.33 \times 10^{-4}$ | $1.08 \times 10^{-4}$ |
| | Membrane resistance ($\Omega$/cm$^2$) | 5.01 | 1.89 | 1.45 | 2.60 | 1.63 |
| Reduction ratio (after test of durability at pH = 12) | Permselectivity | 23.6% | 26.4% | 5.4% | 23.2% | 2.1% |
| | Water permeability | 85.9% | 65.6% | 9.4% | 107.8% | 2.9% |
| | Membrane resistance | 29.1% | 48.8% | 13.3% | 74.5% | 3.2% |

From Table 3, the following facts were found.

Each of the electrolyte membranes of Examples 1 to 15 had high permselectivity of 0.96 to 0.99, low water permeability of $6.30 \times 10^{-5}$ to $7.50 \times 10^{-5}$ ml/m$^2$/Pa/hr, and low electric resistance of a membrane of 1.30 Ωcm$^2$ to 1.61 Ω/cm$^2$, and exhibited excellent performance as an ion-exchange membrane. Moreover, the temporal stability by the test of durability with respect to chlorine was also excellent, the reduction ratio was 11.3% even in a case where the reduction ratio was great in the permselectivity, the reduction ratio was 12.3% even in a case where the reduction ratio was great in the water permeability, and the reduction ratio was 11.1% even in a case where the reduction ratio was great in the electric resistance of the membrane. Furthermore, the durability with respect to acids and alkalis (the test of durability at pH 2, the test of durability at pH 12), all of the reduction ratios in the permselectivity coefficient, the water permeability, and the electric resistance of a membrane in each evaluation test were low, and among these, even in a case where the reduction ratio was the highest one (the reduction ratio in the permselectivity in the test of durability at pH 12), the reduction ratio was 13.4%.

In contrast, as in Comparative Examples 1 to 3, the electrolyte membrane not including the unit c, obtained from a polymerizable compound different from that of the present invention had low permselectivity of 0.87 to 0.89, and also had high water permeability and high electric resistance of a membrane. Moreover, the electrolyte membrane had poor temporal stability in chlorine, an acid, and an alkali, and all of the reduction ratios in the permselectivity, the water permeability, and the electric resistance of a membrane was also greater than 19%.

On the other hand, all of Comparative Examples 4 to 7 were polymers in which a1 to c1 and a2 to d2 of each unit were different from those of the present invention, in Comparative Examples 4 and 5, a1 was greater than 0.75, in Comparative Examples 4 and 6, c1 is 0.000 and the unit c was not included, and in Comparative Example 7, c1 in the unit c was greater than 0.100. In addition, in Comparative Example 5, b1 in the unit b was less than 0.240.

In all of Comparative Examples 4, 5, and 7, the water permeability was high. Among these, in Comparative Example 4, the temporal stability was also low in all of chlorine, an acid, and an alkali.

Although Comparative Example 6 was different from the other Examples only in that Comparative Example 6 did not have the unit c, all the reduction ratios of the temporal stability in chlorine, an acid, and an alkali were 20% or greater, and in contrast, in Comparative Example 7 which was different from the other Examples only in that Comparative Example 7 had many units c, the water permeability was a high value of $1.05 \times 10^{-4}$ ml/m$^2$/Pa/hr.

In addition, it was found that, as produced in Examples, the production method for the ion-exchange polymer and the electrolyte membrane of the present invention could be performed simply at low cost, for example, as in Examples 14 and 15.

Although the present invention has been described with the embodiments thereof, unless otherwise particularly described, the present invention is not intended to be limited in any details of description of the present invention, and it is considered that the present invention must be broadly interpreted without departing from the spirit and the scope of the present invention shown in the appended Claims.

EXPLANATION OF REFERENCES

1: membrane
2: arrow showing that water in a feed solution permeates into a draw solution through membrane
3: flow path of feed solution
4: flow path of draw solution
5: running direction of liquid
10: flow path of device for measuring water permeability

What is claimed is:

1. An ion-exchange polymer, comprising:
a structure represented by the following General Formula (1),

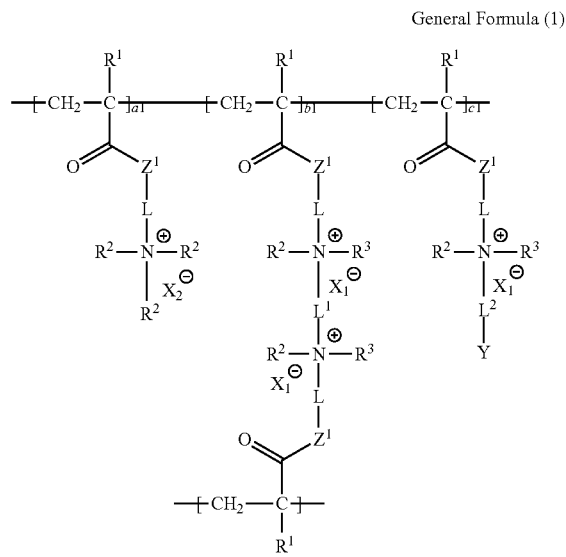

General Formula (1)

wherein, in General Formula (1), in a case where the sum of a1, b1, and c1 is 1.000, a1 is 0.000 to 0.750, b1 is 0.240 to 0.990, and c1 is 0.001 to 0.100, L represents an alkylene group, $L^1$ and $L^2$ each independently represent a divalent linking group, $R^1$ represents a hydrogen atom or an alkyl group, $R^2$ and $R^3$ each independently represent an alkyl group or an allyl group, $X_1^-$ and $X_2^-$ each independently represent an inorganic anion or an organic anion, Y represents a halogen atom, $Z^1$ represents —O— or —NRa—, and here, Ra represents a hydrogen atom or an alkyl group.

2. The ion-exchange polymer according to claim 1, wherein the structure is a structure represented by the following General Formula (2),

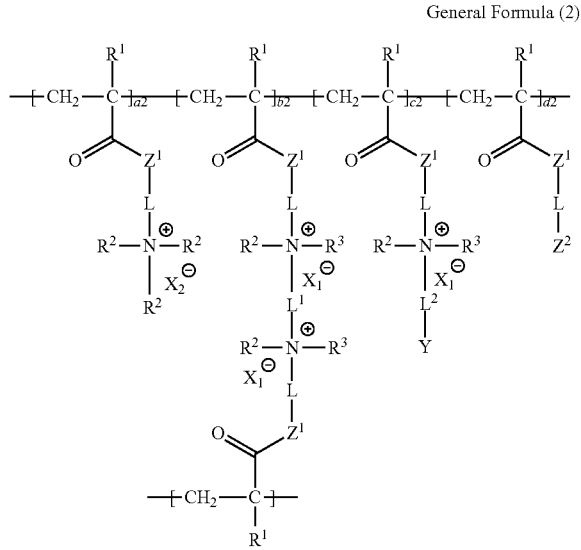

General Formula (2)

wherein, in General Formula (2), in a case where the sum of a2, b2, c2, and d2 is 1.000, a2 is 0.000 to 0.750, b2 is 0.240 to 0.990, c2 is 0.001 to 0.100, and d2 is 0.000 to 0.100, L, $L^1$, $L^2$, $R^1$ to $R^3$, $X_1^-$, $X_2^-$, Y, and $Z^1$ have the same meaning as L, $L^1$, $L^2$, $R^1$ to $R^3$, $X_1^-$, $X_2^-$, Y, and $Z^1$ in General Formula (1), respectively, $Z^2$ represents a group represented by the following General Formula (P-d1) or (P-d2), and $Z^2$ may include both the group represented by General Formula (P-d1) or the group represented by General Formula (P-d2), and General Formula (P-d1)

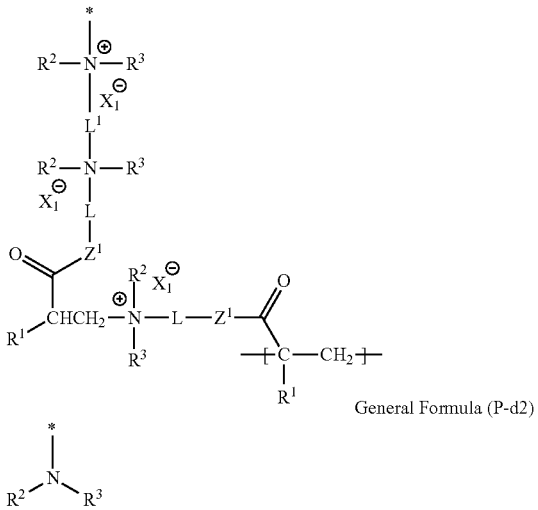

General Formula (P-d2)

wherein L, $L^1$, $R^1$ to $R^3$, $X_1^-$, and $Z^1$ in General Formulas P-d1) and (P-d2) have the same meaning as L, $L^1$, $R^1$ to $R^3$, $X_1^-$, $Z^1$ in General Formula (2), respectively, and here, * represents the portion to which L is bonded.

3. The ion-exchange polymer according to claim 1, wherein c1 or c2 is 0.005 to 0.075.

4. The ion-exchange polymer according to claim 1, wherein b1 or b2 is 0.700 to 0.980, and c1 or c2 is 0.015 to 0.050.

5. The ion-exchange polymer according to claim 1, which is formed by polymerizing and curing a composition containing at least one of a compound represented by the following General Formula (M-b) and at least one of compound represented by the following General Formula (M-c), General Formula (M-b)

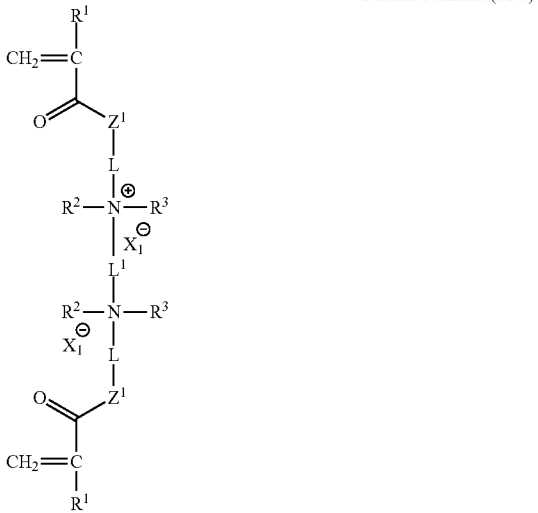

General Formula (M-c)

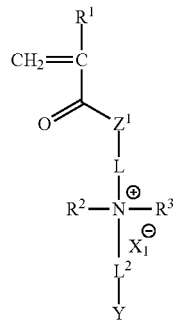

wherein, in General Formulas (M-b) and (M-c), $R^1$ represents a hydrogen atom or an alkyl group, $R^2$ and $R^3$ each independently represent an alkyl group or an allyl group, L represents an alkylene group, $L^1$ and $L^2$ each independently represent a divalent linking group, $X_1^-$ represents an inorganic anion or an organic anion, $Z^1$ represents —O— or —NRa—, and here, Ra represents a hydrogen atom or an alkyl group.

6. The ion-exchange polymer according to claim 5, wherein the composition further contains a compound represented by the following General Formula (M-d2), General Formula (M-d2)

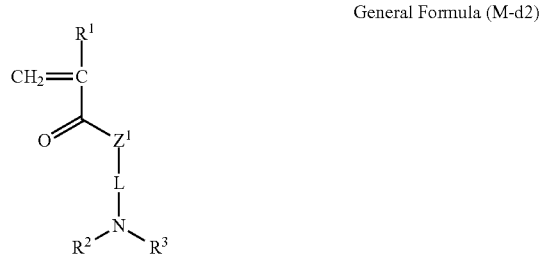

wherein, in General Formula (M-d2), $R^1$ represents a hydrogen atom or an alkyl group, $R^2$ and $R^3$ each independently represent an alkyl group or an allyl group, L represents an alkylene group, $Z^1$ represents —O— or —NRa—, and here, Ra represents a hydrogen atom or an alkyl group.

7. The ion-exchange polymer according to claim 5, wherein the composition further contains a compound represented by the following General Formula (L-c), $Y^a$-$L^2$-Y    General Formula (L-c)

wherein, in General Formula (L-c), $L^2$ represents a divalent linking group, Y and $Y^a$ each independently represent a halogen atom.

8. The ion-exchange polymer according to claim 5, wherein 25.0 mol % to 99.0 mol % of the compound represented by General Formula (M-b) is included with respect to the entire monomer components in the polymer obtained by polymerizing and curing.

9. The ion-exchange polymer according to claim 5, wherein 50.0 mol % to 98.0 mol % of the compound represented by General Formula (M-b) is included with respect to the entire monomer components in the polymer obtained by polymerizing and curing.

10. The ion-exchange polymer according to claim 5, which is formed by polymerizing and curing by irradiating the composition with active radiation.

11. An electrolyte membrane, comprising:
at least one ion-exchange polymer according to claim 1.

12. The electrolyte membrane according to claim 11, comprising:
a support.

13. The electrolyte membrane according to claim 12, wherein the support is selected from woven fabric and non-woven fabric.

14. The electrolyte membrane according to claim 12, which is formed by impregnating the support with the composition, and then polymerizing and curing the composition.

15. A composition for production of an ion-exchange polymer according to claim 1, comprising:
a compound represented by the following General Formula (M-b);
a compound represented by the following General Formula (M-c);
a water-soluble solvent; and
a polymerization inhibitor,

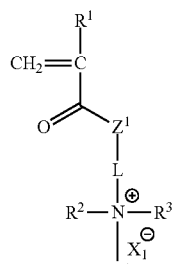

General Formula (M-b)

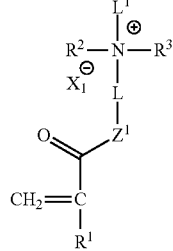

General Formula (M-c)

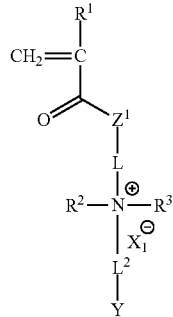

wherein, in General Formulas (M-b) and (M-c), $R^1$ represents a hydrogen atom or an alkyl group, $R^2$ and $R^3$ each independently represent an alkyl group or an allyl group, L represents an alkylene group, $L^1$ and $L^2$ each independently represent a divalent linking group, $X_1^-$ represents an inorganic anion or an organic anion, $Z^1$ represents —O— or —NRa—, and here, Ra represents a hydrogen atom or an alkyl group.

16. The composition for production of an ion-exchange polymer according to claim 15, further comprising:
a compound represented by the following General Formula (M-d2),

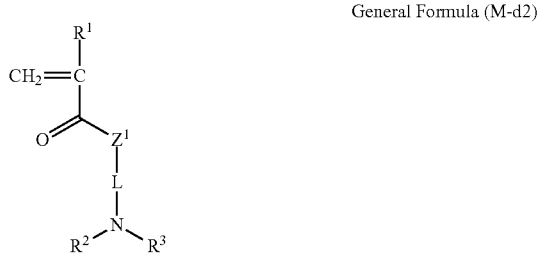

General Formula (M-d2)

wherein, in General Formula (M-d2), $R^1$ represents a hydrogen atom or an alkyl group, $R^2$ and $R^3$ each independently represent an alkyl group or an allyl group, L represents an alkylene group, $Z^1$ represents —O— or —NRa—, and here, Ra represents a hydrogen atom or an alkyl group.

17. The composition for production of an ion-exchange polymer according to claim 15, further comprising:
a compound represented by the following General Formula (L-c),

$Y^a$-$L^2$-Y    General Formula (L-c)

wherein, in General Formula (L-c), $L^2$ represents a divalent linking group, Y and $Y^a$ each independently represents a halogen atom.

18. The composition for production of an ion-exchange polymer according to claim 15,
wherein the water-soluble solvent is water.

19. The composition for production of an ion-exchange polymer according to claim 15,
wherein the compound represented by General Formula (M-b) is contained in the composition in 60 parts by mass to 98 parts by mass with respect to 100 parts by mass of the composition.

20. A production method for an ion-exchange polymer, comprising:
irradiating the composition for production of an ion-exchange polymer according to claim 15 with active radiation to be polymerized and cured.

21. A production method for an electrolyte membrane, comprising:
impregnating the support with the composition for production of an ion-exchange polymer according to claim 15, and then polymerizing and curing the composition.

* * * * *